(12) United States Patent
Kurtz et al.

(10) Patent No.: US 8,180,112 B2
(45) Date of Patent: May 15, 2012

(54) ENABLING PERSISTENT RECOGNITION OF INDIVIDUALS IN IMAGES

(75) Inventors: Andrew Frederick Kurtz, Macedon, NY (US); Madirakshi Das, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1151 days.

(21) Appl. No.: 12/017,131

(22) Filed: Jan. 21, 2008

(65) Prior Publication Data

US 2009/0185723 A1 Jul. 23, 2009

(51) Int. Cl.
*G06K 9/00* (2006.01)
*G06K 9/62* (2006.01)
*G06K 9/68* (2006.01)

(52) U.S. Cl. ........ 382/108; 382/103; 382/115; 382/116; 382/117; 382/155; 382/218; 382/228

(58) Field of Classification Search ............... 382/118, 382/103, 115, 116, 117, 155, 218, 228
See application file for complete search history.

(56) References Cited

U.S. PATENT DOCUMENTS

| | | | |
|---|---|---|---|
| 4,400,725 A | 8/1983 | Tanigaki | |
| 4,754,271 A | 6/1988 | Edwards | |
| 5,164,992 A * | 11/1992 | Turk et al. | 382/118 |
| 5,639,151 A | 6/1997 | McNelley et al. | |
| 5,771,307 A * | 6/1998 | Lu et al. | 382/116 |
| 6,111,517 A * | 8/2000 | Atick et al. | 340/5.83 |
| 6,351,556 B1 | 2/2002 | Loui et al. | |
| 6,509,910 B1 | 1/2003 | Agarwal et al. | |
| 6,606,411 B1 | 8/2003 | Loui et al. | |
| 6,608,914 B1 * | 8/2003 | Yamaguchi et al. | 382/118 |
| 7,042,486 B2 | 5/2006 | Manico et al. | |
| 7,110,575 B2 | 9/2006 | Chen et al. | |
| 7,114,079 B1 | 9/2006 | Cook et al. | |
| 2002/0159643 A1 * | 10/2002 | DeYong et al. | 382/228 |
| 2004/0163105 A1 | 8/2004 | Thursfield | |
| 2004/0247177 A1 * | 12/2004 | Rowe et al. | 382/159 |
| 2005/0074148 A1 * | 4/2005 | Rodyushkin et al. | 382/118 |
| 2005/0111737 A1 | 5/2005 | Das et al. | |
| 2005/0226509 A1 * | 10/2005 | Maurer et al. | 382/190 |
| 2006/0153430 A1 * | 7/2006 | Canzler et al. | 382/118 |
| 2006/0245624 A1 | 11/2006 | Gallagher et al. | |
| 2006/0285665 A1 * | 12/2006 | Wasserblat et al. | 379/114.14 |
| 2008/0013808 A1 * | 1/2008 | Russo et al. | 382/125 |

FOREIGN PATENT DOCUMENTS

| | | |
|---|---|---|
| EP | 1 460 580 A1 | 9/2004 |
| EP | 1 737 216 A1 | 12/2006 |

OTHER PUBLICATIONS

Grother, et al. "Performance of Biometric Quality Measures." IEEE Transactions on Pattern Analysis and Machine Intelligence. 29.4 (2007): 531-543. Print.*

(Continued)

*Primary Examiner* — Michael A Newman
(74) *Attorney, Agent, or Firm* — Kevin E. Spaulding

(57) ABSTRACT

A method and system for accumulating and using images of individuals, and associated image-derived data, on an continuous basis to create recognition models that facilitate ongoing recognition of individuals in images or photo collections.

32 Claims, 10 Drawing Sheets

OTHER PUBLICATIONS

Wu, E. A. (2004). Self-evaluation for video tracking systems. Manuscript submitted for publication, Department of Electrical and Computer Engineering, University of Maryland, College Park, MD. Retrieved from http://www.dtic.mil/cgi-bin/GetTRDoc?AD=ADA431637&Location=U2&doc=GetTRDoc.pdf.*

"*Kodak Easyshare EX1011 Digital Picture Frame Features & Benefits*"; http://www.kodak.com, Oct. 22, 2007.

"*Cherish: Smart Digital Photo Frames for Sharing Social Narratives at Home*"; Jeong Kim and John Zimmerman; Conference on Human Factors in Computing Systems;CHI 2006, pp. 953-958.

"*Digital Family Portraits: Supporting Peace of Mind for Extended Family Members*", Elizabeth D. Mynatt, Jim Rowan, Annie Jacobs and Sarah Craighill; Proceedings of the 2001 ACM Conference on Human Factors in Computing Systems; (CHI 2001), Mar. 31-Apr. 5, 2001, pp. 333-340.

"*Cross-Generation Communication via Digital Picture Frames*", Elizabeth D. Mynatt and Jim Rowan; Proceedings of the IFIP WG 9.3 International Conference on Home Oriented Informatics and Telematics (HOIT 2000).

"*Face Recognition: A Literature Survey*", W. Zhao, R. Chellappa, P. J. Phillips, and A. Rosenfeld; ACM Computing Surveys; vol. 35, No. 4, Dec. 2003, pp. 399-458.

"*Eigenfaces for Recognition*", M. Turk and A. Pentland; Journal of Cognitive Neuroscience; 1991 Massachusetts Institute of Technology, vol. 3, No. 1, pp. 71-86.

"*Active Shape Models—Their Training and Application*", T. F. Cootes, C. J. Taylor, D. H. Cooper, and J. Graham; Computer Vision and Image Understanding; vol. 61, No. 1, Jan. 1995, pp. 38-59.

"*Constrained Active Appearance Models*", T. F. Cootes and C. J. Taylor; 8th International Conference on Computer Vision; IEEE Computer Society Press, vol. 1, Jul. 2001, pp. 748-754.

"*An Automatic Facial Feature Finding System for Portrait Images*", by Mark R. Bolin and Shoupu Chen; from Eastman Kodak Company; in the proceedings of IS&T's 2002 PICS Conference; pp. 226-231.

"*Face Recognition Using Shape and Texture*", Chengjun Liu and Harry Wechsler; from Department of Computer Science—George Mason University; IEEE 1999, CVPR '99 Conference, vol. 1, pp. 1598-1603.

"*Face Recognition Based on Fitting a 3D Morphable Model*", by Volker Blanz and Thomas Vetter; IEEE Transactions on Pattern Analysis and Machine Intelligence; vol. 25, No. 9, Sep. 2003, pp. 1-12.

"*Detection, Analysis and Matching of Hair*", Yaser Yacoob and Larry Davis; Computer Society; Proceedings of the Tenth IEEE Intternational Conference on Cumputer Vision; (ICCV '05), Trans. on PAMI, vol. 28, pp. 1164-1171, 2006.

"*Head Pose Determination from one Image Using a Generic Model*"; I. Shimizu, Z. Zhang, S. Akamatsu, and K. Deguchi; Proceedings IEEE International Conference on Automatic Face and Gesture Recognition; 1998.

* cited by examiner

TRAINING SET

HOUSEHOLD SET

ENABLING PERSISTENT RECOGNITION OF INDIVIDUALS IN IMAGES

CROSS-REFERENCE TO RELATED APPLICATIONS

U.S. Pat. No. 7,362,919 issued Apr. 22, 2008, filed on Nov. 25, 2003, entitled: "Method For Generating Customized Photo Album Pages And Prints Based On People And Gender Profiles", by M. Das et al.; and U.S. Pat. No. 7,522,773 issued Apr. 21, 2009, entitled: "Using Time In Recognizing Persons In Images", by A. Gallagher et al.; and U.S. Patent Application Publication No. 2008/0298643 published Dec. 4, 2008, entitled: "Composite Person Model From Image Collection", by J. Lawther et al.; and U.S. Patent Application Publication No. 200810298571 published Dec. 4, 2008, entitled: "A Residential Video Communication System", by A. Kurtz et al., are assigned to the same assignee hereof, Eastman Kodak Company of Rochester, N.Y.; and contain subject matter related, in certain respects, to the subject matter of the present invention. The above-identified patent applications are incorporated herein by reference in their entirety.

FIELD OF THE INVENTION

The present invention relates to a method and system for accumulating and using images of individuals, and associated image-derived data, on an ongoing basis to create recognition models that facilitate the recognition of individuals in images or photo-collections.

BACKGROUND OF THE INVENTION

In the modern world, photographs, and particularly digital images can be acquired by numerous sources, including: digital cameras, camcorders, cell phones (phone cams), web cams, and video phones. Personal consumer images, whether of themselves, family, or friends, are generated using these and other devices. Thus, with the advent of digital photography, consumers are amassing large collections of digital images and videos. Currently, the length of time spanned by a typical consumer's digital image collection is only a few years. However, the average number of images captured with digital cameras per photographer is still increasing each year. Unfortunately, the organization and retrieval of images and videos from electronic data file collections is already a problem for the typical consumer. The organization and retrieval problem will continue to grow as the length of time spanned by the average digital image and video collection increases.

A user often desires to find images and videos containing a particular person of interest. The user can perform a manual search to find images and videos containing the person of interest. However this is a slow, laborious process. Even though some commercial software (e.g., Adobe Album) allows users to tag images with labels (metadata) indicating the people in the images so that searches can later be done, the initial labeling process is still very tedious and time consuming.

Digital images can also be tagged using algorithmic methods that target various search and sorting strategies. For example, digital pictures can be searched and sorted based upon event classifications or people recognition and identification. Other reference data, such as time and date, location (including GPS-enabled), object or pet recognition, and capture condition data can be used to support the search, sorting, and tagging processes. Of course, in many cases, people recognition and identification is particularly important.

Face recognition software assumes the existence of a ground-truth labeled set of images (i.e., a set of images with corresponding person identities). Most consumer image collections do not have a similar set of ground truth images. The ground-truth labeled set of images can be based upon reference images, from which derived quantitative data representing key facial attributes or features, can be used as identity markers. In addition, the labeling of faces in images is complex because many consumer images have multiple persons in them. So simply labeling an image with the identities of the people in the image does not indicate which person in the image is associated with which identity. Recognition of people in images (still or video) can also be facilitated using other cues, including eye, skin, or hair color, presence and geometry of eyewear, color and pattern in clothing (apparel), traits of physical motion, and voice characteristics (prosody).

Automatic recognition of individuals in consumer still images, including images from photo-collections, as well as typical consumer video images, is complicated by the unconstrained nature of these images. As consumer images are not captured using the sensibilities of a professional photographer, the framing, pose, and lighting may be less than optimal, which can complicate later identification efforts. Moreover, as consumers are unconstrained in their picture taking events, the settings, appearance, backgrounds and foregrounds, and user activities are very diverse as compared to posed studio photography. Multiple people can often be found in the same frame, and occlusion or partial obscuration of an individual (particularly their face) frequently occurs.

One approach to enable the identification of people using previously captured still images is described in the commonly assigned U.S. patent application Ser. No. 11/755,343, by Lawther et al. Lawther '343 anticipates a person recognition method that works with photo-collections spanning multiple events or sub-events. A set of images is analyzed, with people and faces being located and counted, and then characterized relative to relevant features (face, pose, hair, etc.). An interactive person identifier algorithm is used to identify unique faces in the images. If an image contains a person that the database has no record of, the interactive person identifier displays the identified face with a circle around it in the image. Thus, a user can label the face with the name and any other appropriate types of data. However, if the person has appeared in previous images, data associated with the person can be retrieved for matching, using person classifier algorithms and personal profile data. Such recorded distinctions include person identity, event number, image number, face shape, face points, Face/Hair Color/Texture, head image segments, pose angle, 3-D models and associated features. The method of the Lawther '343 application, attempts to use facial data collected from multiple images taken during an event or multiple time proximate image capture events, to construct a composite model of at least a portion of the particular person's head (face). An image capture event can be a singular occurrence in space and time, or a series of led events or sub-events that fall within a larger super-event. Lawther '343 then anticipates that the composite model of an individual can be used to identify images of that individual in photos captured during subsequent time proximate capture events. Lawther '343 further anticipates that if substantial time gaps occur between use of the composite model and subsequent image capture events, that the composite model can be morphed to compensate for changes in facial characteristics.

Commonly assigned U.S. Pat. Nos. 6,606,411 and 6,351,556, both by A. Loui et al., disclose algorithms for clustering image content by temporal events and sub-events. U.S. Pat. No. 6,606,411 teaches that events have consistent color distributions, and therefore, these pictures are likely to have been taken with the same backdrop. For each sub-event, a single color and texture representation is computed for all background areas taken together. The above patents teach how to cluster images and videos in a digital image collection into temporal events and sub-events. The disclosures of the above patents are hereby incorporated by reference in their entirety. The terms "event" and "sub-event" are used in an objective sense to indicate the products of a computer mediated procedure that attempts to match a user's subjective perceptions of specific occurrences (corresponding to events) and divisions of those occurrences corresponding to sub-events). A collection of images can be classified into one or more events, based on time or date clustering and texture comparison mapping of the images. The plurality of images is separated into the events based on having one or more identified boundaries between events, where the boundaries correspond to the one or more largest time differences. For each event, sub-events (if any) can be determined by comparing the color histogram information of successive images as described in U.S. Pat. No. 6,351,556. Dividing an image into a number of blocks and then computing the color histogram for each of the blocks accomplishes this. A block-based histogram correlation procedure is used as described in U.S. Pat. No. 6,351,556 to detect sub-event boundaries.

Taken together, the approaches described in the Loui '411 and Loui '556 patents can be used to cluster digital images into relevant photo collections, and the composite face model method of the Lawther '343 application can be used as an aid in recognizing individuals within the digital images of the photo collections. However, the face recognition method of Lawther '343 is vulnerable to misidentification of individuals over time, as their facial characteristics change in ways not properly compensated by morphing of a composite model (or other facial models).

By comparison, commonly assigned U.S. Patent Publication No. US 2006/0245624 A1 (U.S. patent application Ser. No. 11/116,729), by Gallagher et al., entitled: "Using Time in Recognizing Persons in Images", anticipates a process of photo recognition that utilizes different facial models of an individual for recognition, based upon the age of the individual. In particular, Gallagher '624 anticipates that an appearance model generator generates a series of appearance models for an individual over the course of time, such that a set of appearance models spans a period of an individual's life. For example, an additional appearance model may be generated periodically every year or every five years, depending on the age of the person. A set of appearance models for an individual spanning a period of life can be subsequently used to recognize the individual in pictures from that time span. In particular, an individual recognition classifier uses the image capture time associated with a set of images and the features of an appearance model having an associated time that is associated with a particular person of interest, to produce a person classification describing the likelihood or probability that the detected person is the person of interest. More generally, these appearance models can then be used to identify the individual in prior or subsequent captured consumer still images including that person.

Notably, Gallagher '624, in a fashion similar to Lawther '343 anticipates that the appearance models of a person will be assembled using collections of time-clustered and labeled (user verified) images that include that person. Thus, while Lawther '343 anticipates adapting to changes in personal appearance over time by morphing the facial (composite) models; Gallagher '624 anticipates pro-actively generating new facial models periodically, according to a schedule based on user age. However, both Lawther '343 and Gallagher '624 use images from photo-collections to build their facial or composite models, as these images become available. Neither of these approaches anticipates pro-actively assessing the need to generate new recognition models for individuals in response to changes in their appearance, nor pro-actively generating the models in response to the recognized need.

It is noted that a variety of complimentary or competing facial recognition models have been developed in recent years. A rather complete survey of recognition models is provided by the paper: "*Face Recognition: A Literature Survey*", by W. Zhao, R. Chellappa, P. J. Phillips, and A. Rosenfeld; which was published in ACM Computing Surveys, Vol. 35, pp. 399-458, 2003.

The first proposed facial recognition model is the "Pentland" model, which is described in: "*Eigenfaces for Recognition*", by M. Turk and A. Pentland, in the Journal of Cognitive Neuroscience, Vol. 3, No. 1, pp. 71-86, 1991. The Pentland model is a 2-D model intended for assessing direct-on facial images. The utility of this model can be limited for consumer pictures, as subjects can be oriented any which way. This model throws out most facial data and keeps data indicative of where the eyes, mouth, and a few other features are. These features are located by texture analysis. This data is distilled down to Eigen vectors (direction and extent) related to a set of defined face points (such as eyes, mouth, and nose) that model a face. As the Pentland model requires accurate eye locations for normalization, it is sensitive to pose and lighting variations. Although the Pentland model works, it has been much improved upon by newer models that address its limitations.

The Active Shape Model (ASM) is another facial model useful for recognizing people in images. The ASM, which is a 2-D facial model with faces described by a series of facial feature points, was described in the paper: "*Active Shape Models—Their Training and Application*", by T. F. Cootes, C. J. Taylor, D. Cooper, and J. Graham; published in Computer Vision and Image Understanding, No. 61, pp. 38-59, January 1995. As originally discussed by Cootes et al., the ASM approach can be applied to faces as well as other shapes or objects. For faces, Cootes et al. only anticipated using face points related to the eyes, nose, and mouth. However, in the previously mentioned 2002 paper by Bolin and Chen, the application of ASM for face recognition was enhanced with an expanded collection of facial feature points, and in particular the 82 facial feature point model depicted in FIG. 5*a*. Localized facial features can be described by distances between specific feature points or angles formed by lines connecting sets of specific feature points, or coefficients of projecting the feature points onto principal components that describe the variability in facial appearance. These arc-length features are divided by the interocular distance to normalize across different face sizes. The facial measurements used here are derived from anthropometrical measurements of human faces that have been shown to be relevant for judging: gender, age, attractiveness, and ethnicity. Point PC is the point located at the centroid of points 0 and 1 (i.e. the point exactly between the eyes). The accompanying Table 1 and Table 2 describe a series of linear and arc length facial features that can be quantified using the 82 facial feature point model shown in FIG. 5*a*. A more complete listing of derivable facial features is given in the commonly assigned Das '308 application (equivalent to U.S. Patent Publication No. US 2005/0111737 A1).

TABLE 1

List of Arc Length Features

| NAME | COMPUTATION |
|---|---|
| Mandibular Arc | Arc (P69, P81) |
| Supra-Orbital Arc | (P56-P40) + Int (P40, P44) + (P44-P48) + Arc (P48, P52) + (P52-P68) |
| Upper-Lip Arc | Arc (P23, P27) |
| Lower-Lip Arc | Arc (P27, P30) + (P30-P23) |

TABLE 2

List of Ratio Features

| NAME | NUMERATOR | DENOMINATOR |
|---|---|---|
| Eye-to-Nose/Eye-to-Mouth | PC-P2 | PC-P32 |
| Eye-to-Mouth/Eye-to-Chin | PC-P32 | PC-P75 |
| Head-to-Chin/Eye-to-Mouth | P62-P75 | PC-P32 |
| Head-to-Eye/Eye-to-Chin | P62-PC | PC-P75 |
| Head-to-Eye/Eye-to-Mouth | P62-PC | PC-P32 |
| Nose-to-Chin/Eye-to-Chin | P35-P75 | PC-P75 |
| Mouth-to-Chin/Eye-to-Chin | P35-P75 | PC-P75 |
| Head-to-Nose/Nose-to-Chin | P62-P2 | P2-P75 |
| Mouth-to-Chin/Nose-to-Chin | P35-P75 | P2-P75 |
| Jaw Width/Face Width | P78-P72 | P56-P68 |
| Eye-Spacing/Nose Width | P07-P13 | P37-P39 |
| Mouth-to-Chin/Jaw Width | P35-P75 | P78-P72 |

This expanded active shape model is more robust than the Pentland model, as it can handle some variations in lighting, and pose variations ranging out to 15 degrees pose tilt from normal. Notably, the ASM does not use or model texture based data, such as that related to hair and skin.

As a further progression in recognition models, the active appearance model (AAM) expands upon the ASM approach by complementing the geometry data and analysis with texture data. The texture data, which is high frequency data related to wrinkles, hair, and shadows, can be applied to each facial location. The ASM approach is described in: "*Constrained Active Appearance Models*", by T. F. Cootes and C. J. Taylor, published in the 8th International Conference on Computer Vision, Vol. 1, pp. 748-754, IEEE Computer Society Press, July 2001. The AAM approach utilizes more information, and thus is more robust than the ASM approach for identification and recognition. The AAM approach is used in the previously discussed and commonly assigned Gallagher '624 patent application. However, the AAM is only a 2-D model, and is more sensitive to lighting and pose variations than the ASM approach, which limits its use to frontal pictures only.

By comparison "composite" models 360 represent an advance of facial recognition models to a 3-D geometry that maps both the face and head. The composite model approach was introduced in: "*Face Recognition Based On Fitting A 3-D Morphable Model*", by V. Blanz and T. Vetter, which was published in IEEE Transactions on Pattern Analysis and Machine Intelligence, Vol. 25, pp. 1063-1074, 2003. In general, this concept extends the facial feature point approach of the ASM over multiple poses. As described by Blanz and Vetter, a reference 3-D facial model and facial characteristics of the human face was created by scanning multiple faces with a light beam from a laser scanner. Thereafter, for a new subject, a collection of pictures of the person is acquired at different poses under a range of lighting conditions. Then, a 3-D model of that person can be generated by fitting their facial shape and texture data to the reference 3-D facial model. Using the person-specific 3-D facial model, that individual can be subsequently recognized in a new picture. This approach does provide accurate pose estimation, with ~1° resolution. But the recognition process is slow with current software, as it takes several minutes to match anyone.

The previously cited, commonly assigned Lawther '343 application provides an alternate approach to Blanz and Vetter for creating a 3-D facial model (composite model) for photo-analysis. In particular, in Lawther '343, the subjects are not constrained by an image acquisition process involving a sequence of multiple poses and lighting conditions. Rather, the process of Lawther '343 attempts to generate a 3-D composite model 360 for an individual from a collection of existing pictures. The pictures, which can vary by pose or lighting, are analyzed to retrieve the available facial feature points (see FIG. 5a) according to the expanded ASM approach of Bolin and Chen. A composite model 360 of the individual is then generated by mapping the facial feature points from the multiple pictures into a "master" composite model 360. Of course, this approach is sensitive to the potential of missing data in the available collection of pictures. That is, if a collection of pictures of an individual lacks certain poses, this approach cannot compensate, and can at best interpolate, but with reduced accuracy. As a result, an exemplary partially complete composite model, assembled with only frontal and right side images, is lacking key data to support recognition of that individual relative to an image with a left side facial pose.

Of course, the success rate of facial recognition models in image recognition tasks will decrease when the image assessment is applied to back of the head images with little actual facial data. In such instances, an appearance model that accounts for the texture and shape of the hair can be useful. One such approach is described in the paper "*Detection and Analysis of Hair*", by Y. Yacoob and L. David, published in IEEE Trans. on PAMI, Vol. 28, pp. 1164-1169, 2006.

An exemplary pose estimation modeling approach is described in "*Head Pose Determination From One Image Using a Generic Model*", by Shimizu et al., published in the Proceedings IEEE International Conference on Automatic Face and Gesture Recognition, 1998. In this approach, edge curves (e.g., the contours of eyes, lips, and eyebrows) are first defined for the 3-D model. Next, an input image is searched for curves corresponding to those defined in the model. After establishing a correspondence between the edge curves in the model and the input image, the head pose is estimated by iteratively adjusting the 3-D model through a variety of pose angles and determining the adjustment that exhibits the closest curve fit to the input image. The pose angle that exhibits the closest curve fit is determined to be the pose angle of the input image.

As implied in the previous discussion, the appearance of people tends to change over time, due to aging, behavioral factors (use of cosmetics, tanning, hair style changes), exercise, health factors, or other reasons. As a result, recognition of individuals in photographs or digital images is impeded, as pre-existing facial or composite models become inaccurate. Presently, the ground truth linkage of identity with image data, and particularly facial image data, requires continuing intermittent input from the users. Although approaches, such as that of Gallagher '624 may improve person recognition by updating facial models according to a reasonable schedule, dramatic facial changes between scheduled updates to the models can reduce the success rate. Thus, a method for acquiring ongoing images or image derived data of individuals of known identity, and applying this image data to facial or head recognition models, can enable more robust or persistent identification of the individuals in ongoing or subsequent images. Preferably, such a method would utilize, update, and support one or more facial recognition models, including composite models 360.

SUMMARY OF THE INVENTION

A preferred embodiment of the present invention includes a computer-implemented method for enabling persistent electronic recognition, over time, of a particular person in images. In the context of the present invention, machine recognition and computer recognition and electronic recognition refer to a programmed execution unit or device capable of processing and analyzing digital image data. The method of the preferred embodiment further includes analyzing a plurality of facial images of a person using a facial recognition model of the person to identify changes in facial appearance of the person. A next step of the preferred embodiment includes calculating subject recognition confidence values for the facial images and comparing the subject recognition confidence values for the facial images to subject recognition confidence values of the facial recognition model to identify changes in the confidence values. These are used to determine whether a newer facial recognition model for the person is required for continued accuracy. If so, a new facial recognition model is generated from current or subsequent images of the person and is thereafter used for subsequent person recognition tasks. A preferred embodiment of the method includes tracking subject recognition confidence values over time to identify changes in the facial appearance of a person that can become indicative of a need to generate a new facial recognition model. This optionally includes normalized ratios of probabilities calculated from similarity score distributions that are probability distributions indicative of the matching of a known face and an unrecognized face. An optional step might include capturing a complete set of images spanning a number of individual poses of a particular person to generate a recognition model of the person. The method can be applied to one or more persons that comprise a household in order to enable recognition of these persons in images associated with the household. Relevant images can be acquired using an electronic imaging device such as a: digital picture frame, cell phone, video phone, camera, scanned from a photo collection, web camera, etc. A microphone can be provided for enabling capture of voice characteristics to provide further cues for recognizing a person. Facial recognition models can be obtained from a 3-D composite model, an active shape model, or an active appearance model. Generating the model can include the optional step of normalizing acquired facial images relative to color, grey scale, and size. An amount of change in the images can be measured based on a variety of metrics such as percent of change, total change, thresholds, abruptness or rate of change, and duration of change. Each of these can be separately applied, as desired, to particular pre-selected facial features and includes the use of facial metrics.

Another preferred embodiment of the present invention includes a system comprising an image capture device for capturing a plurality of facial images of a person. The captured images are stored, together with a previously generated facial recognition model of the person, which includes a model confidence value. The system further includes means for identifying differences between the facial images and the facial recognition model and means for calculating subject recognition confidence values for the facial images. Further means are included for comparing the subject recognition confidence values to the model confidence value and for generating a new facial recognition model if a difference between the subject recognition confidence values for the facial images and the model confidence value is substantial. The substantiality of difference can be determined in a variety of ways, such as by using predetermined thresholds, percent of change, total amount of change, abruptness or rate of change, and duration of change.

Other embodiments that are contemplated by the present invention include computer readable media and program storage devices tangibly embodying or carrying a program of instructions or algorithms readable by machine or a processor, for having the machine or computer processor execute instructions or data structures stored thereon. Such computer readable media can be any available media that can be accessed by a general purpose or special purpose computer. Such computer-readable media can comprise physical computer-readable media such as RAM, ROM, EEPROM, CD-ROM, DVD, or other optical disk storage, magnetic disk storage, or other magnetic storage devices, for example. Any other media that can be used to carry or store software programs which can be accessed by a general purpose or special purpose computer are considered within the scope of the present invention.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof and the invention includes all such modifications. The figures below were not intended to be drawn to any precise scale with respect to size, angular relationship, or relative position.

DETAILED DESCRIPTION OF THE INVENTION

While digital photography has revolutionized consumer behavior relative to image capture, use, and sharing, the association of semantic information with the images is impeded by the anonymous digital file structure. As image data files collect in electronic storage devices, the images can become less approachable than the stereotypical shoebox of 4"×6" prints. Although file names can be changed, and metadata can be associated with images, enabled by various types of consumer input or software automation (relative to capture conditions, photo-analysis, etc.), it is difficult to make these associations robust.

In one aspect, evolving face recognition and identification algorithms are improving the ability of photo-software to associate people and their identities with electronic images, while reducing the need for human intervention. In particular, these methods rely on a ground truth initiation step, in which one or more reference or baseline images of an individual are associated with the identity of the individual. An individual user may provide images of that individual or other individuals, as well as the accompanying identity information, and other pertinent semantic information (age, relationships, gender, ethnicity, etc.). It is then anticipated that the photo software will use these baseline images, and data derived there from (including facial models, appearance models, and composite models), as well as the semantic data, to subsequently recognize individuals in photo-collection images and tag or link these images.

Figure 1:
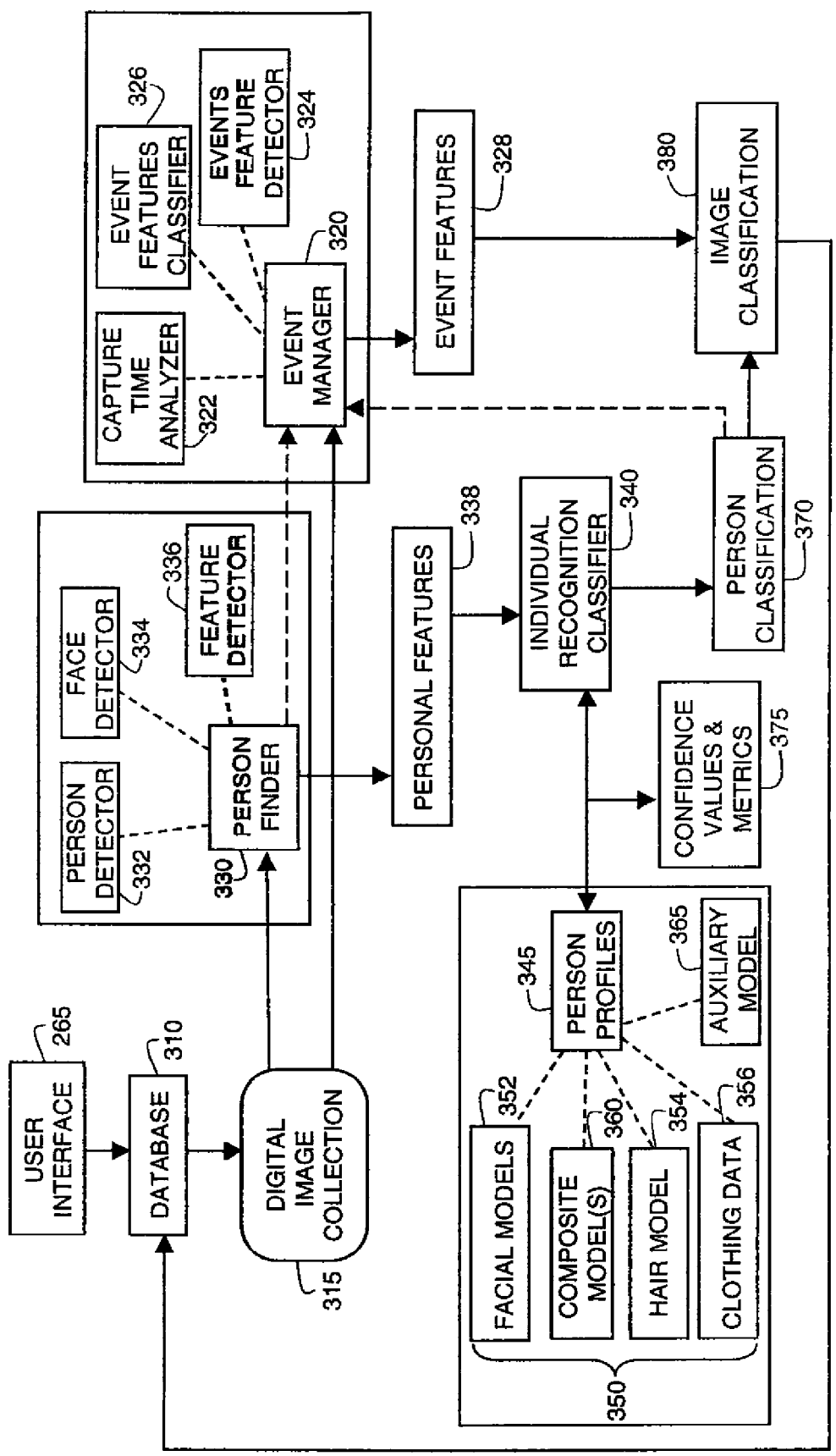
FIG. 1 is a system diagram for performing a digital image analysis process in which an image or set of images are analyzed based on semantic and facial cues.

To illustrate this point, FIG. 1 depicts the general operation of a system 300 for a semantically based digital image analysis process in which a digital image collection 315 is analyzed by various algorithms, including an event manager 320, a person finder 330, and an individual recognition classifier 340. The objective is to enable users 100 (FIGS. 2A and 2B) to successfully query database 310 containing the digital image collection 315, via user interface 265, to find images and videos containing one or more persons of interest. Alternately, users 100 may use the image analysis system 300 to automatically identify persons of interest in newly available images or image collections for later use.

Figure 5D:
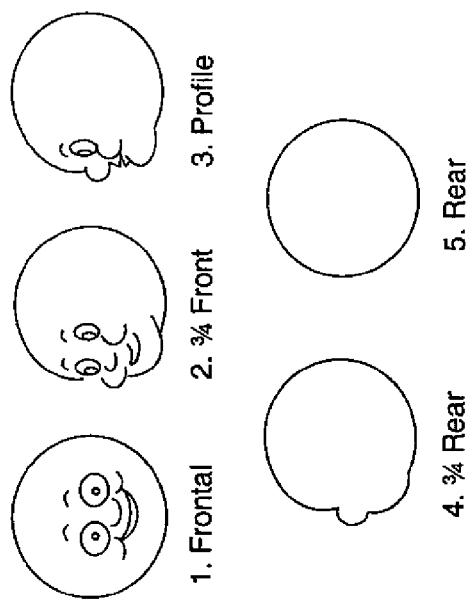
FIG. 5d depicts various facial or head poses.
Figure 5A:
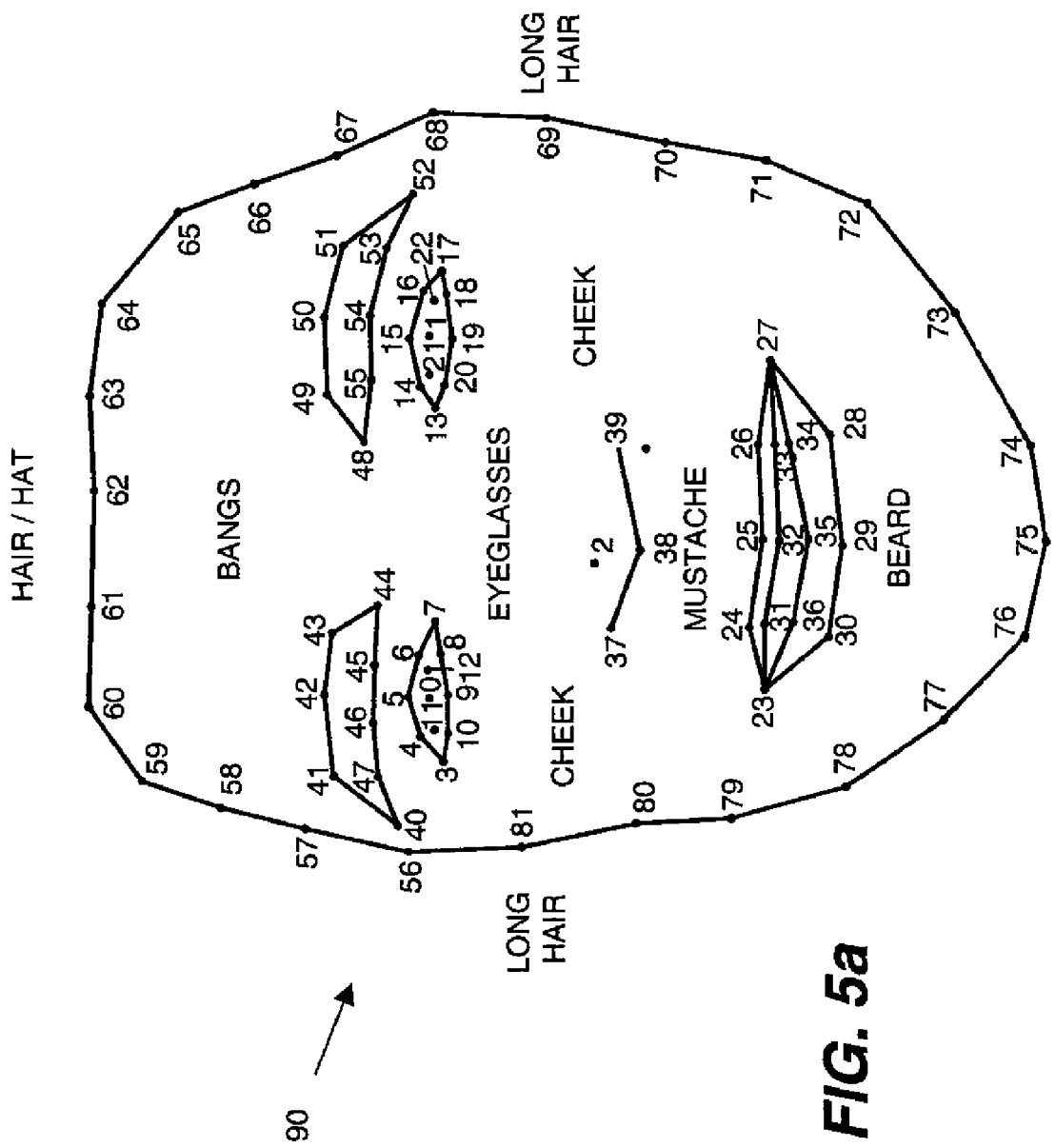
FIG. 5a depicts a facial-feature modeling-construct having 82 facial feature points.

To enable this, a new image, or an image collection, or a video must be analyzed to identify the people therein. A person finder 330 can use a person detector 332 to find persons within the photograph or image, for example by locating body like shapes. People can also be found using face detector 334, which finds faces or parts of faces using a local feature detector 336. Face detector 334 can also include a pose estimator to estimate facial pose. Associated features with a known person can be identified using an associated features detector. The person finder 330 preferably outputs personal features 338 for each detected person in an image. Preferably the personal features include the locations of 82 feature points associated with specific facial features, as shown in FIG. 5a and described below. Other personal features 338, such as eye color, skin color, hair color, face shape, gender, body shape, body size, or clothing (color, texture, patterning), can potentially be provided as output using appropriate quantifiable descriptors. Obviously, person recognition tasks are easiest with frontal poses, as the greatest number of face points (1-82) is accessible.

The personal features 338 are provided as input to the individual recognition classifier 340, which seeks to link a personal identity (a person's name) to particular images of a person depicted in an image or image collection. The person profiles 345, which can include semantic information about individuals, including identity, family relationships, age, gender, and facial model data, is key to this. The person profiles 345 can include relational databases containing distinguishing characteristics of a person, including favorite activities, home addresses and GPS coordinates, and a collection of home images (which can aid event clustering). Although an embodiment of the present invention is focused on maintaining recognition models for persons residing at a given residence, personal profiles, including recognition models, for non-residents can be used as well.

As another aspect, the person profiles 345 also contain, or are linked to, associated recognition models 350 for each profiled individual. These recognition models 350 mainly comprise "ground truth" biometric data, including facial recognition models 352 [such as an eigen face model, an appearance model (both 2-D), a hair model 354, or a voice or gait model (for video)], which can all be used by the individual recognition classifier 340. The recognition models 350 are tagged for time periods of relevance, so that prior, current, and subsequent images can be processed through a recognition task using temporally relevant recognition models. In particular, composite models 360, which are pose-based 3-D models of an individual's head and face, can also be used. To facilitate identification, composite models 360 are rotated to the estimated pose angle for the image of interest, and then feature matching is attempted. Non-biometric personal behavior information, including favorite activities or clothing data 356 can also be used. Ideally, the individual recognition classifier 340 uses a portion of the available data to successfully match an image of a person with a personal identity (person's name), and then it outputs a person classification 370. Person classifications can include non-subject (unknown or non-tracked person), subject [or user, such as Edward, Ashley (cousin), Grandma Emily, or Michael Barnes (friend)], or uncertain identification. As an additional output, particular to one embodiment of the present invention, subject recognition confidence values 470, facial metrics 475 (FIG. 7), and other state measures can be determined (using metrics calculation step 375). The subject recognition confidence values 470 indicate the system-estimated likelihood (probability) that the person detected by the person finder 330 is a person of interest.

In parallel, event manager 320 can contribute to image management and organization by clustering digital image subsets into relevant time periods based upon an assessment using a capture time analyzer 322 and an event features classifier 326. The capture-time analyzer 322 determines the time the digital image or video was captured, and outputs that image capture time. For example, the EXIF image format allows the image or video capture device to store information associated with the image or video in the file header. The "Date\Time" entry is associated with the date and time the image was captured. Other capture condition metadata, including GPS location, can also be used. The event features detector 324 examines the image data to identify and classify image attributes (involving shapes, colors, patterns, text, people clustering, etc.) that are present in one or more images. Data from the person finder 330 can be used to link common people across multiple images. The events features classifier 326 then seeks to associate the identified attributes with recognizable human activities, such as meals, parties, sports, or weddings. The event classifications can be completed using the methods described in the commonly assigned Loui '411 and Loui '556 patents. Other semantic data, such as individual calendar information, can be used if available. Event manager 320 thereby links event attributes with given images and identifies digital image collection subsets associated with given events. This output is provided as event features 328.

The events features data 328 and the person classification data 370 are brought together to complete image classification 380, which provides output data back to the database 310. The person classification data 370 can be used to link one or more known people with given images and sets of images. As personal relationships lead to repeat clustering of people at events, group clustering can aid both identity determination and event recognition. The resulting image classification data can be added to the database 310, and users 100 can be queried to validate identification results.

However, as noted previously, the success of automated software identification of individuals in images can be adversely affected by changes in the physical appearance of the individuals. The appearance of people tends to change over time, due to aging, behavioral factors (use of cosmetics, tanning, or hair style changes), exercise, health factors, cosmetic surgery, or other reasons. As a result, automatic photo recognition using an established set of ground truth image data and semantic data can then fail (diminished persistence), as it lacks knowledge of relevant changes in an individuals appearance following the establishment of ground truth data. Another factor in failure could be the absence of example images under varying poses and illuminations in the ground truth image data. For example, the ground truth library may be lacking a profile view, or an image under outdoor illumination, and encountering these conditions in a new image could lead to failed recognition. As the success rate of recognition of individuals in digital images drops (which can be measured by reduced subject recognition confidence values 470 of FIG. 7), user frustrations are likely to increase. While users can be queried to update the semantic information, recognition efforts can continue to fail if the identity linked facial recognition models are not updated. As one approach, the commonly assigned Lawther '343 application suggests altering a composite model of an individual by image morphing in order to compensate for such physical changes. As another approach, the commonly assigned Gallagher '624 application anticipates a method in which new appearance models of individuals are generated using new images coming into the database 310, according to an age-based schedule. However, if the physical changes to an individual's appearance are dramatic enough, neither image model morphing nor scheduled recognition model updates using available images may be sufficient to improve the success rate during subsequent recognition efforts.

Conceptually, the intent of a preferred embodiment of the present invention is that images of known individuals can be assessed relative to pre-existing ground truth image data to determine whether new images are needed to enhance person identification. In particular, a preferred embodiment of the present invention anticipates a system or device that pro-actively assesses the appearance changes of known individuals, and then pro-actively acquires or uses image data, from which facial and recognition model data can be derived, as appropriate. For example, an image capture device (camera) situated within a residence can acquire images of one or more individuals on an ongoing, but likely intermittent, basis over the course of time. Of course, capture of facial images is emphasized, as people derive visual knowledge of identity principally from facial features. Additionally, a longitudinal record of images, or image derived data relating to identity attributes can be accumulated as date-linked ground truth image (model) data sets. This longitudinal record of image-derived data (including facial and head models) can be used during photo recognition by the photo analysis software to reduce the uncertainty or error in algorithmically identifying individuals in images. As will be discussed in greater detail below, a preferred embodiment of the present invention to use an in-residence camera or cameras to acquire the appropriate images on an as-needed basis, so as to then provide the needed image derived data for the facial models 352 or composite models 360 used in a photo recognition system 300 such as shown in FIG. 1.

Figure 2A:
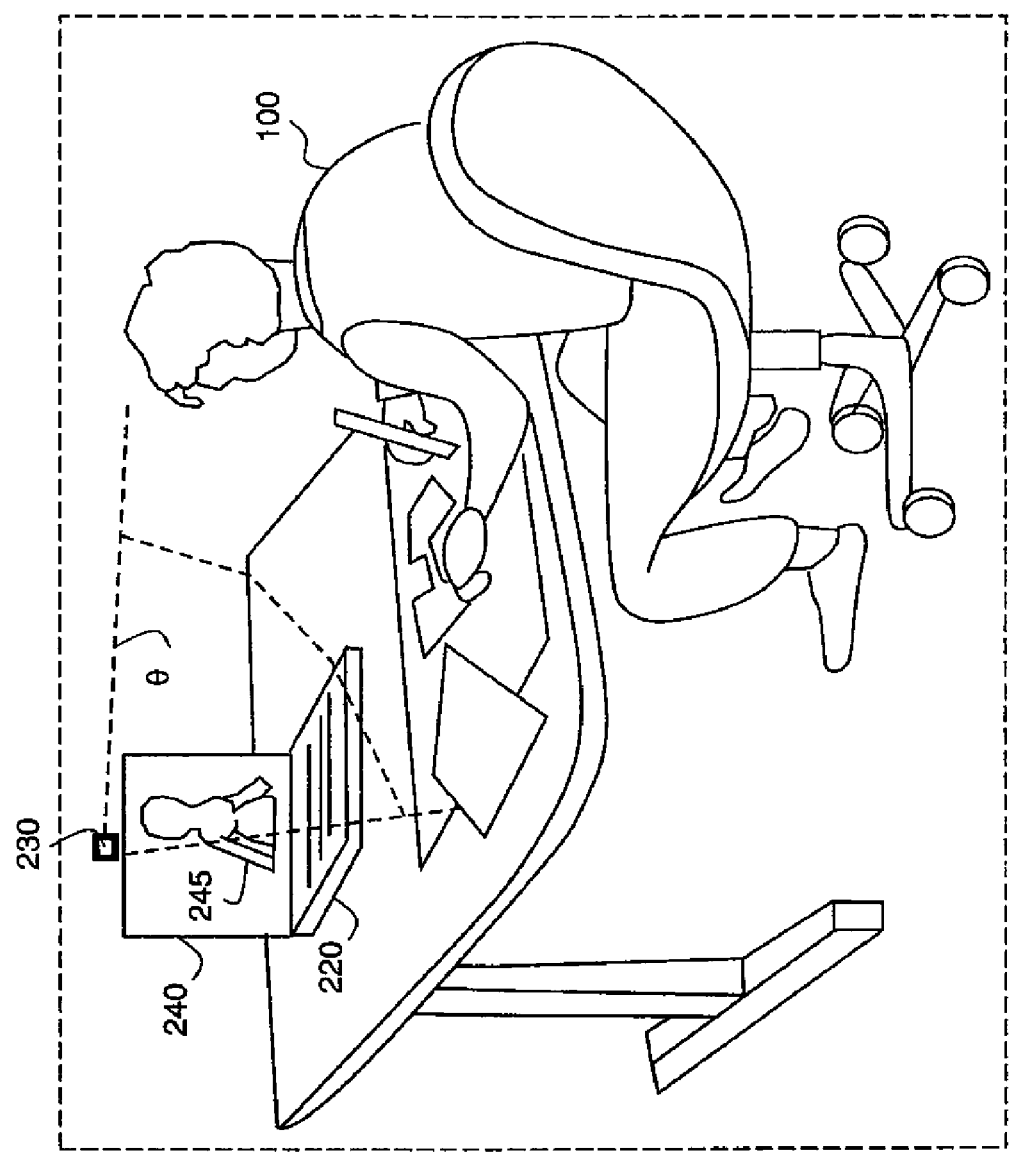
FIGS. 2a and 2b are illustrations of local users interacting with an electronic device that includes a camera.

Conceivably, the camera can be associated with any of a range of common, or potentially common, electronic devices that may be found in a home or residence For example, as shown in FIG. 2a, a local user 100 is working at a table and using a computer 220 during a potential image capture event 400. The computer 220 has an image capture device (camera) 230 that may be a web cam. In this example, the screen 245 of the electronic display 240 of computer 220 is depicting an image of another person, which may be a photographic still image or a live video image. While the local user 100 is engaged in activities at the table, perhaps using the computer or not, the camera 230 can acquire images of the user 100 for various reasons, including for the purposes of a preferred embodiment of the present invention. Camera 230 captures and images light from within an angle θ. Camera 230 can be provided by a range of potential electronic devices, including digital cameras, video cameras, phone cams, web cams, video phones, video game system cameras, or health monitoring cameras.

Figure 2B:
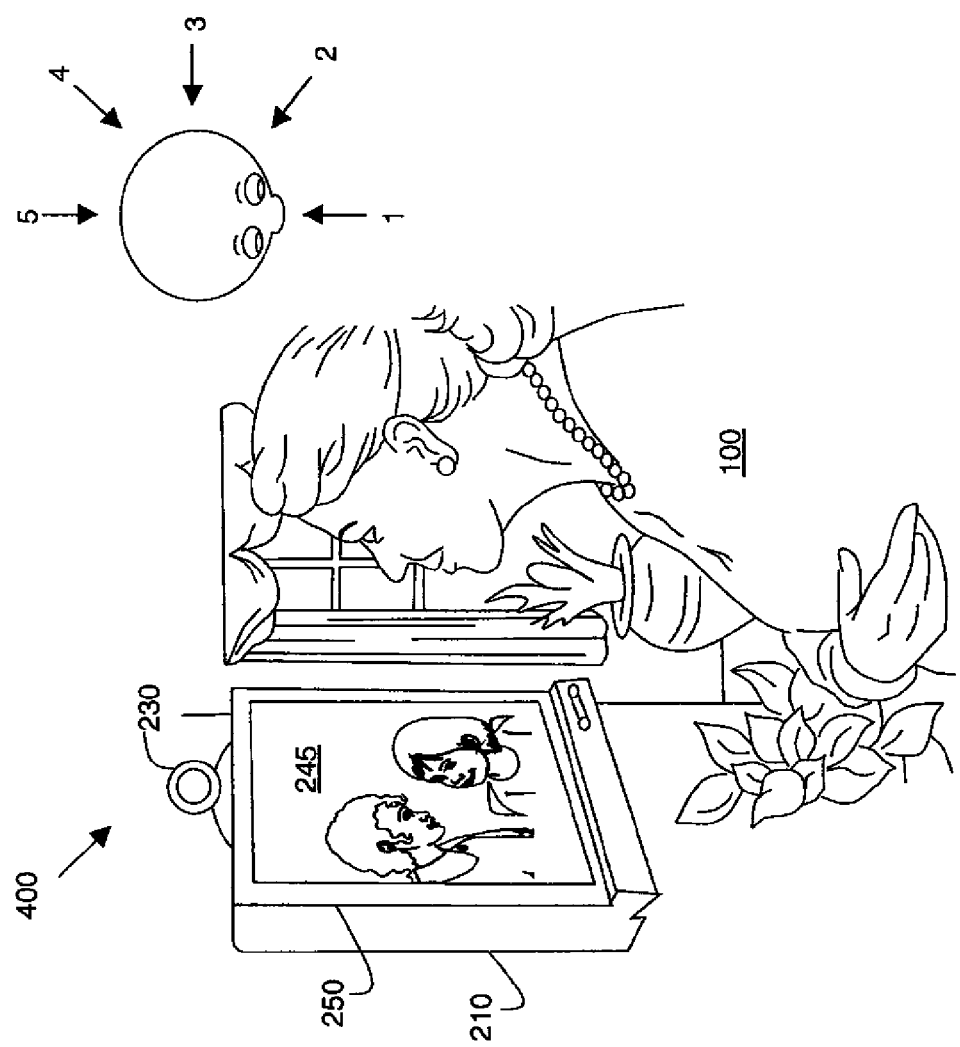

Preferably, the camera 230 can acquire the needed images unobtrusively, without requiring the local users to consciously pose for the camera 230. While the example of FIG. 2a, in which a web cam is attached to a computer 220, can enable image capture of a local user 100 for the purposes of a preferred embodiment of this invention, FIG. 2b depicts an alternate exemplary image capture event 400 in a preferred embodiment of the present invention. As shown in FIG. 2b, a local user 100 is looking at images depicted on the screen 245 of a wall mounted electronic image device 210, which is further equipped with a camera 230 located along the upper portion of frame 250. While the electronic image device 210 can be a television or a video communication device, it is preferably an electronic picture frame that displays digital images. As such, device 210 can utilize camera 230, in combination with face recognition software and semantic association software, to identify an individual user 100, and then access and display images associated with that individual. In that context, the camera 230 enables device 210 to provide a direct benefit to the user 100, by personalizing their image viewing experience. Additionally, for the purposes of a preferred embodiment of the present invention, this same device 210 can then use camera 230, the aforementioned face recognition software, and other contributing components of a preferred embodiment of the present invention to acquire images that enable persistence in recognition of people in still or video images. In this instance, with device 210 as an electronic picture frame, the capability (improving recognition of people) is directly linked to a potential benefit (viewing of semantically linked images). Such a linkage is aesthetically desirable and may increase consumer acceptance of this capability, with less perceived invasiveness, as compared to enabling the capability via a web cam, video phone, or other device. Also, as people tend to pause when viewing pictures, there will be a prolonged opportunity to acquire the quality images required for a preferred embodiment of the present invention.

As shown in FIG. 2b, the electronic image device 210 can be an electronic (or digital) picture (photo) frame, with a computer 220 located locally, or remotely, connected by a wireless link. The basic elements of an electronic picture frame are described in U.S. Pat. No. 4,754,271, by W. Edwards, which includes an electronic display (LCD), memory, supporting circuitry, and a user interface. Digital picture frames, which are only now becoming popular, are often equipped with more capabilities than anticipated by Edwards '271. For example, commonly assigned U.S. Pat. No. 6,509,910, by Agarwal et al., anticipates a media frame capable of sharing digital images and objects, without having to interface with a PC or server. Thus, electronic frames, such as the *Kodak EasyShare EX1011 Digital Picture Frame*, allow wireless content transfer, audio play, content viewing control, and other features.

Adaptation of other features and capabilities to digital photo frames continues to be explored in the patent art and technical literature. As one example, in the paper: "*Cherish: Smart Digital Photo Frames for Sharing Social Narratives at Home*", by J. Kim et al., and published in the CHI (Computer Human Interaction), 2006 proceedings, a wirelessly enabled digital photo frame is anticipated that interfaces with distributed smart-home sensors to detect individuals in the home and access appropriate images. As another example, the digital picture frame described in: "*Digital Family Portraits: Supporting Peace of Mind for Extended Family Members*", by Elizabeth D. Mynatt et al., and published in the CHI 2001 proceedings, anticipates a digital picture frame in which the image is a standard still photograph (rather than an electronically displayed image), and the bounding frame is changed digitally on a daily basis to convey relevant information (such as well-being) about the person depicted in the photograph. The addition of a camera 230 to an electronic picture frame (device 210 shown in FIG. 2b) also enables enhanced capabilities, including using face recognition of the viewer to tailor content presentation to that viewer.

In the case of a preferred embodiment of the present invention, a preferred embodiment is to associate a camera 230 with an electronic image device 210 that is a digital picture frame. The camera 230 is typically an electronic image capture device having both an imaging lens and an imaging sensor (neither of which are shown), which can acquire still or video images. The imaging sensor can be either a CCD or CMOS type imager, as is well known in the art. The camera 230 can also be equipped with pan, tilt, or zooming capabilities, to enable the image capture process to locate or follow users, or acquire close-up images. As depicted in FIGS. 2a and 2b, the camera 230 is mounted at the upper edge of frame 250, above the electronic display 240. However, camera 230 can be mounted along the sides or bottom edges of the display 240, or alternately be detached from the electronic image device 210 (or computer 220), and communicate via a wireless link. The camera 230 can also be positioned behind the display 240, such that it images the user 100 through the display itself Concepts for such "displays that see" devices are known in the prior art. One exemplary device is described in commonly assigned U.S. Pat. No. 7,042,486, entitled: "Image Capture and Display Device", by Manico et al. Other exemplary devices of this type are described in U.S. Pat. No. 5,639,151, entitled: "Pass-Through Reflective Projection Display", by McNelley et al., and U.S. Pat. No. 4,400,725, entitled: "Picture display-Image Pickup Apparatus", by Tanikagi.

For the purposes of the present invention, a preferred embodiment is to acquire current images of the individuals in a residence on an ongoing but intermittent basis, perhaps daily, weekly, monthly, yearly, or longer. It is also preferable to fulfill the objectives of a preferred embodiment of the present invention in an unobtrusive way that people will readily accept, without it feeling invasive. Certainly, the individuals can be alerted that image capture is occurring, or even be asked to rotate their head through a range of poses to aid the process. However, it is also desirable to reduce user annoyance and the occurrence of stilted or exaggerated behaviors. Therefore it is generally preferable to provide the capabilities of a preferred embodiment of the present invention via an electronic device 210 that people will derive additional or alternate value from under natural conditions. Thus, as shown in FIGS. 2a and 2b, a preferred embodiment of the present invention can be realized using a preferred embodiment wherein an electronic image device 210, such as a computer, a digital picture frame, a web cam, or a video phone, that people will frequently use. An exemplary video phone is described in commonly assigned U.S. patent application Ser. No. 11/756,532, entitled: "A Residential Video Communication System", by A. Kurtz et al.

It is anticipated that the image capture conditions, such as body (head) pose and lighting, will be rather variable. For example, interior lighting in a residence will be much more variable than in a photo studio, but also generally less variable than in the range of pictures (indoor, outdoor, daytime, nighttime, etc.) typically seen in consumer photography. While head pose will be variable at any given moment, as individuals (users 100) use device 210, it is anticipated that they will naturally position themselves through a range of direct on, side, and back of the head positions, for which images can be acquired for the photo recognition purposes of a preferred embodiment of the present invention. However, image capture, image processing, and data extraction will likely be more difficult than for pictures captured in studio conditions, as the capture conditions are more variable.

Figure 3:
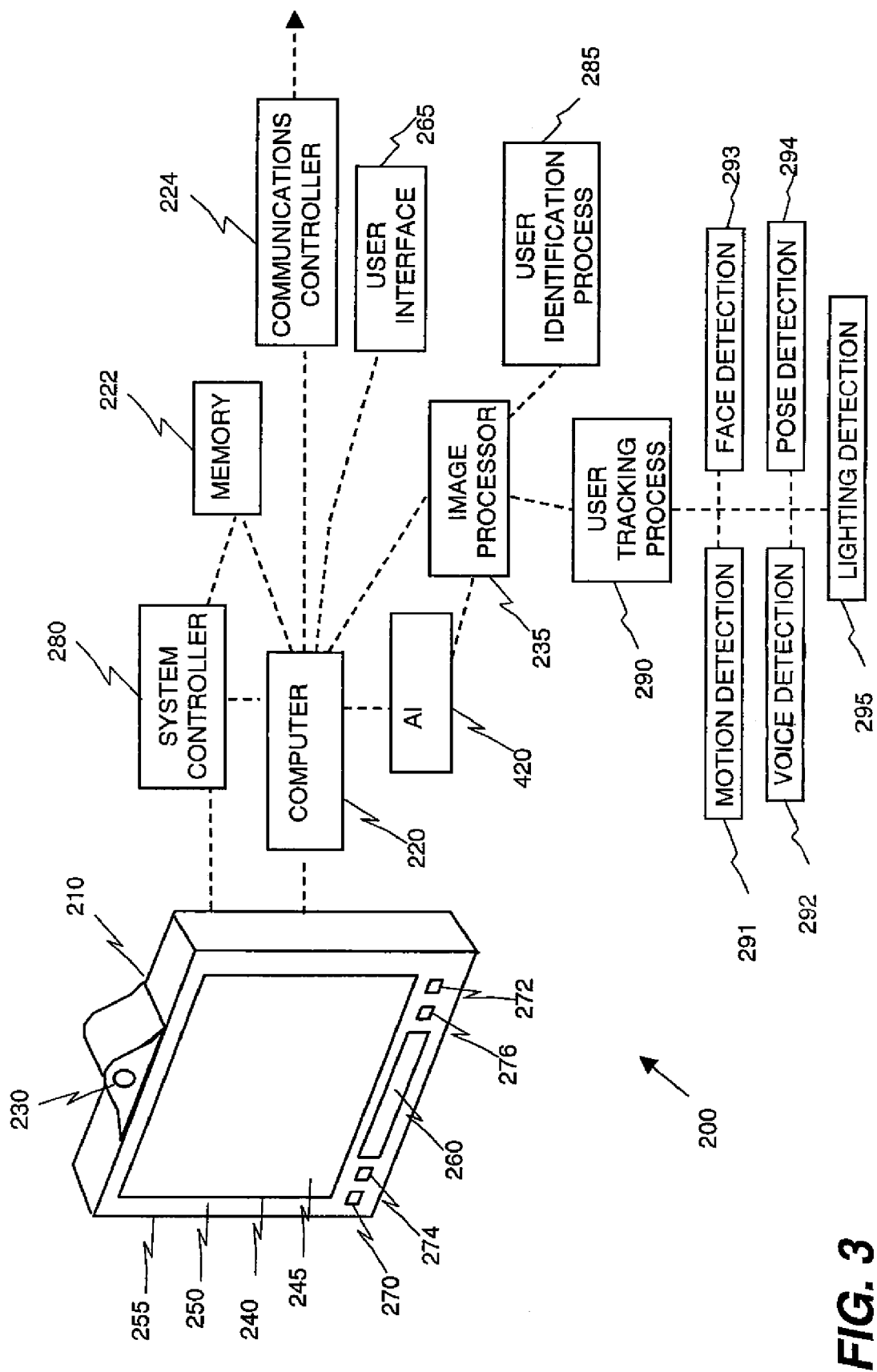
FIG. 3 depicts a hardware and software configuration useful for an embodiment of the present invention.

The method for enabling persistent recognition of individuals in images in a preferred embodiment of the present invention is supported by a combination of hardware and software that comprises a preferred embodiment of a recognition model update system 200 depicted in greater detail in FIG. 3. The system 200 features an electronic image device 210, which can be an electronic picture frame, a videophone, or a TV or computer with a web cam, that again includes a camera 230, and an electronic display 240 (LCD, OLED, or other type) with a screen 245 located within a frame 250 of a housing 255. Device 210 can also have user interface controls 260, a microphone 270, a speaker 272 for emitting audio, a motion detection sensor 274, and an ambient light detector 276. The device 210 is linked to a computer 220, which can be provided internally, or via a network link. The computer is linked to a systems controller 280, which controls operations of the camera 230, the display 240, the user interface controls 260, the motion detection sensor 274, and other hardware components. The computer 220 is also linked to memory (or data storage) 222, a communications controller 224, an image processor 235, a user interface 265, a user tracking (or algorithm) 290, and user identification software/process 285. Algorithms, program instructions, or software specific or Germaine to the present invention can be loaded into memory 222 via a program storage media such as a DVD or flash drive. Communications controller 224 is linked to a network (not shown). The dashed lines represent a subset of the possible data communications paths within device 210.

The user tracking process 290, which can simplify to face tracking during image capture, is enabled by environmental sensing processes or software algorithms, including motion detection 291, voice detection 292, face detection 293, pose detection 294, or lighting detection 295. Signals derived from the microphone 270, the motion detection sensor 274, the ambient light detector 276, and the camera 230, provide input data for the calculations undertaken by these algorithms. The subject (user or person) detection and tracking process 290 of FIG. 3 is similar to the people finder 330 of FIG. 1, except that it handles live events in real time. An audio processor (not shown) can also be included. The user interface 265 can include voice recognition technologies, as well as a touch screen as part of user interface controls 260.

Most of the recognition model update system 200 depicted in FIG. 3 is not unique. For example, the display 240, camera 230, and image processor 235 can be provided as part of a standard computer or video phone system. Likewise, the user tracking process 290 and user identification process 285 are components that can be used by a variety of intelligent devices, including automation equipped video phones or health monitoring systems. The recognition model intelligent agent 420 shown in FIG. 3 is a unique aspect related to a preferred embodiment of the present invention, which includes special software algorithms that anticipate and fulfill the need for images and image derived models useful for enabling persistence in recognizing people in images. The recognition model intelligent agent (AI) 420 can comprise a series of interacting algorithms and databases, a program of instructions, an artificial intelligence, a learning system, or a neural network.

Figure 4:
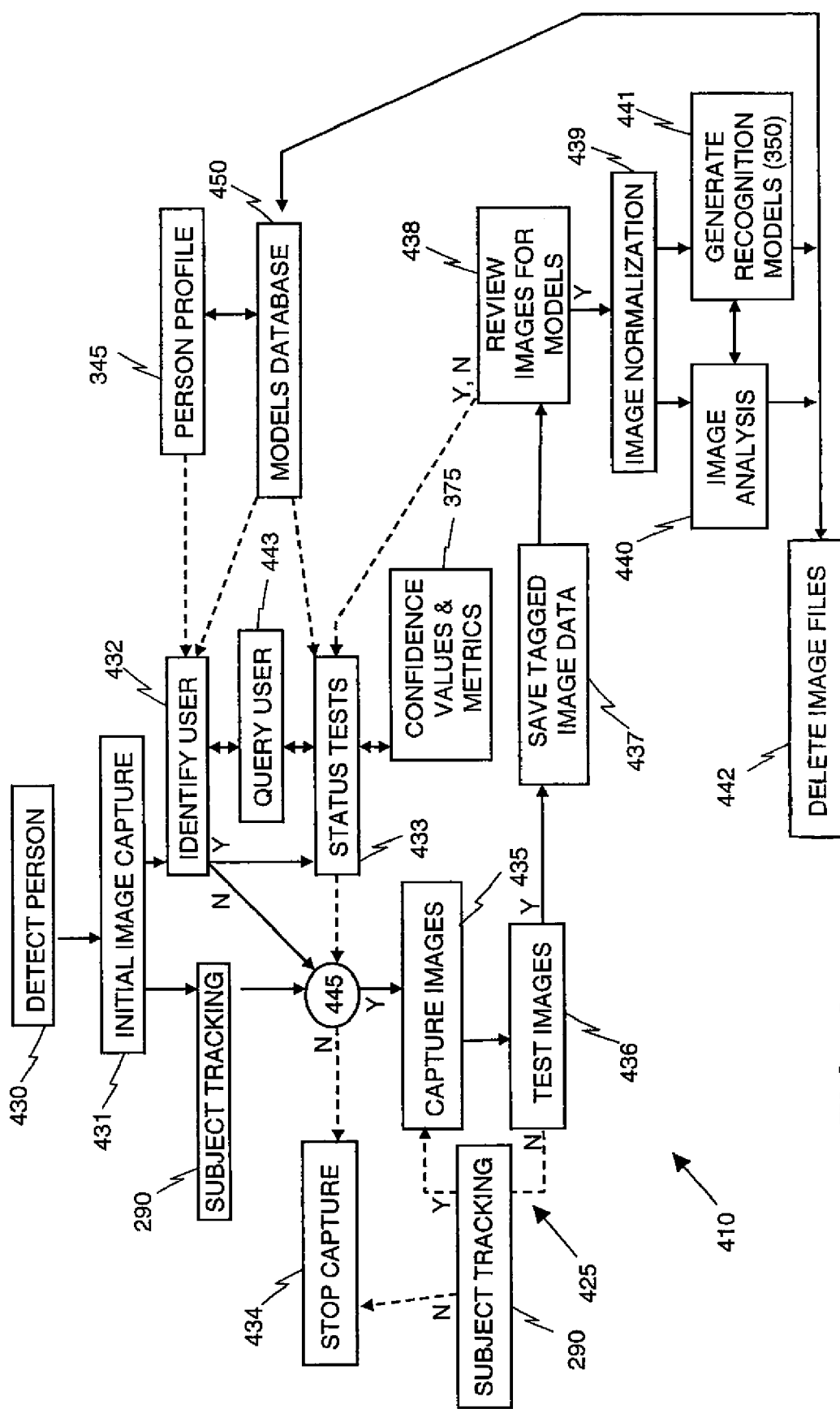
FIG. 4 is a flow diagram depicting a recognition model update process involving pro-active image capture.

FIG. 4 illustrates a recognition model update process 410 that can occur during an image capture event 400, as the recognition model intelligent agent 420 executes its algorithms or equivalent logic to enable persistence in the recognition of individuals in their images on an ongoing basis. In a first step (430), a person (user 100) is detected in front of the electronic device 210 and camera 230, using motion detection 291, voice detection 292, or other techniques. In a second step, an initial image capture 431 of a potential subject is obtained by camera 230, with support by the user tracking process 290 and pose estimation to acquire a good image for face recognition. Thereafter, the user tracking process 290 can continue to monitor the potential subject, while the subject is validated as a known user 100 of the residence. During this identify user step 432, the best (or sufficient) newly captured image of the subject is compared to the pre-established recognition models 350 (face models 352, composite models 360, or reference images 358) available for the known users 100 from the recognition models database 450 or the person profiles 345. If it is determined that the subject is not a user of known interest to the AI 420 it will signal decision node 445 accordingly, then subject tracking 290 and image capture by camera 230 are stopped via stop capture step 434 (through decision node 445). If a subject identity is indeterminate, the user can be queried (step 443).

However, if identify user step 432 determines (with high probability, as measured via subject recognition confidence values 470) that the subject is a user 100 of known interest, then a status test 433 follows, to determine whether new images are needed. An affirmative answer will be signaled to decision node 445, which causes the recognition model update process 410 to continue in a picture gathering state (continuing image capture 435). The affirmation can be based on a variety of reasons, including an age test, which considers the users age and the origination date of the most recent recognition models. An affirmative answer can also occur if the set of target images needed to complete on or more in-process recognition models is not yet complete. The status test answer can also be based on detected changes in a user's appearance, as measured (metrics calculation step 375) by subject recognition confidence values 470, or by pronounced changes in unique or significant facial features, as measured by other facial feature metrics (475). The user age data, recognition model age or completeness data, and longitudinal changes in user appearance data can be supplied by a recognition models database 450, which is stored in a memory 222. If any of these criteria cause the status test 433 to yield an affirmative answer, then the recognition model update process 410 continues to the step of recognition model image capture 435. But if all these various criteria yield a negative answer then image capture is stopped (step 434) via decision node 445.

Accordingly, with an affirmative answer, recognition model image capture 435 attempts to acquire a new set of ground truth target images of the identified user 100 via a camera 230, seeking any target images identified from the recognition models database 450 during the course of status tests 433. As will be discussed subsequently, the target images sought of a subject (user 100) can span a range of different facial poses and lighting conditions. Image acquisition (step 435) proceeds, aided by subject (and face) tracking. As new subject images are captured, they can be tested (step 436) for adequacy, based on image quality (such as image size, contrast, lighting, and resolution) and subject pose (a good pose?—a desired target pose?). If an image is adequate, it is tagged for later use and saved (step 437), and image capture (step 435) and image capture testing (step 436) continues within image capture loop 425 until the subject leaves or all the desired ground truth target images are obtained and stop capture 434 is triggered. When image capture (step 435) ceases, then the collection of available subject images can be reviewed (step 438) to determine if a recognition model(s) can be generated. A result of the review is then supplied to the status test (step 433) indicating whether more target images are needed (or not) to complete a ground truth set of an individual for model generation.

When the requisite collection of subject images are available, one or more recognition models 350 can be generated, starting with image normalization (step 439), followed by image analysis (step 440), and model generation (step 441). These tasks can be completed off-line (non-real-time). Completed recognition models 350 can be supplied to recognition models database 450 and the person profiles 345. The image analysis step (440) can operate on both image data and the recognition models. Its functions include analyzing the images to derive data for face texture models (includes color) and face geometry models (face points, head shape), as well as calculating subject recognition confidence values 470 that can be useful for in person recognition in images. This step can also include analysis to derive measures for longitudinally tracking facial features (facial metrics 475) or to compare newly generated recognition models to prior models or images for the subject. When calculation of the new recognition models, facial metrics 475, and subject recognition confidence values (470) are complete, the target images that were acquired for the recognition model update process 410 can be optionally deleted (step 442). AI 420 supports a variety of these functions, but particularly image normalization 439, image analysis 440, recognition model generation (step 441), user identification 432, status testing 433 and status monitoring (step 438), and image testing 436.

Figure 5C:
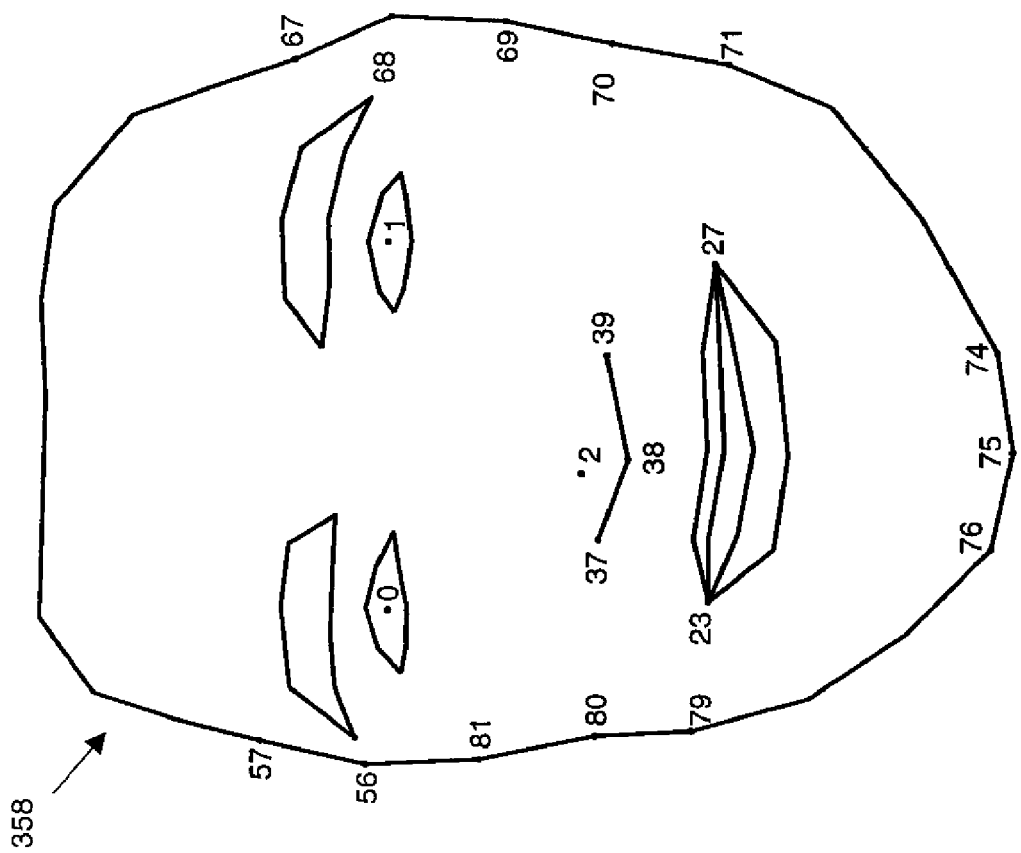
FIGS. 5b and 5c depict the general concepts of a facial reference image.
Figure 5B:
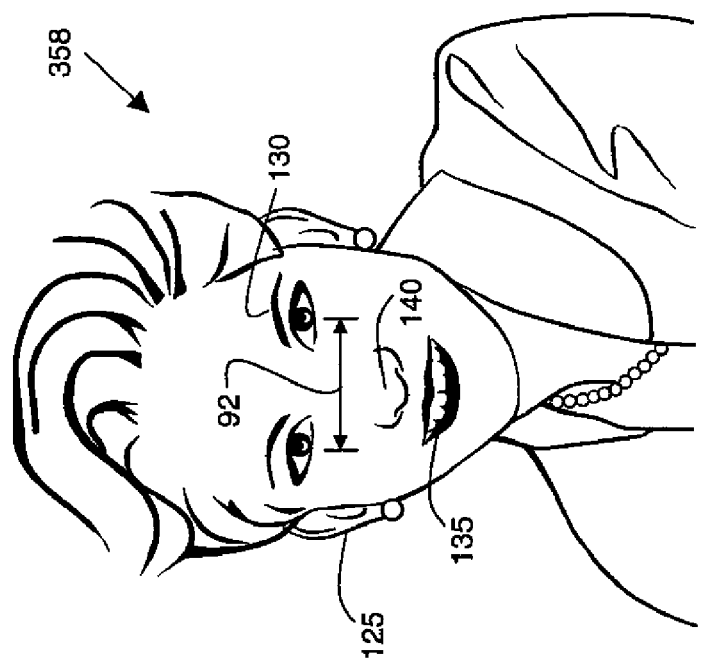

In the preceding discussions, various facial images and models, including reference images 358, have been mentioned. FIG. 5a illustrates the concept of a detailed 82-point face model (90), while FIGS. 5b and 5c illustrate the concept of a facial reference image 358. The 82 facial feature points are defined according to the Active Shape Model-based method described in "*An Automatic Facial Feature Finding System For Portrait Images*", by Bolin and Chen, in the Proceedings of IS&T PICS Conference, pp. 226-231, 2002. Their method uses local texture matching to localize feature points, followed by the application of global shape constraints learned from training examples. FIG. 5a shows the locations of the feature points on a face. While the face point model 90 of FIG. 5a is useful for face detection and recognition, and will be discussed in detail subsequently, a less detailed image, the reference image 358 of FIGS. 5b and 5c, also can have value. The reference image 358 is a less detailed, frontally based image model, which is captured under well-lit conditions. A reference image 358 can be stored as an actual image (FIG. 5b) or as a simplified facial model (FIG. 5c). With the reduced detail, based on using a reduced set of face points (~8-20) to represent a few salient reference features 92, subject identification can be expedited with a captured image. Such reference features 92 can include the interocular distance between the eyes 130. Other exemplary selected facial reference features can relate to the mouth 135, the cheek-to-cheek distance across the face 125, the eye centerline to nose 140 distance. Additionally, side view reference images 358 can also be generated and used. During initial image capture 431 and the image capture loop 425 activities, reference images 358 can be particularly useful for image capture and subject tracking, as well as pose tracking and pose estimation.

The task of recognizing individual people from images can be supported by a variety of recognition models that quantify or model various facial attributes, including various facial models 352, composite models 360, and hair models 354. While a well-lit, frontal (direct-on) image is useful input for many of the recognition models, some of them require additional input images. In particular, as previously discussed, the Pentland Eigenface model, the active appearance model (AAM), and the active shape model (ASM) are all 2-D models that utilize direct-on or frontal images. Whereas, the composite model approach (360), which extends the ASM facial feature point approach over multiple poses requires multiple pose images in addition to the standard frontal image. Likewise, the Yaccoob hair model requires acquisition of images from various non-frontal poses, in addition to the typical frontal image.

Thus a preferred embodiment of the present invention anticipates a recognition model update process 410 in which one or more useful recognition models 350 can be supported by pro-actively acquiring the appropriate images of a subject (user 100), from which the model(s) can pro-actively be derived. In particular, a preferred embodiment of the present invention anticipates that a sufficient set of target images for a subject, spanning different poses and lighting conditions, will be obtained to assemble a complete 3-D composite model for that individual. As part of the process (image analysis step 440), data supporting a face point model 90, nominally using the 82 feature points depicted in FIG. 5a, will be derived from the collection of target images acquired via capture loop 425. Using that data, a composite model 360 will be generated via model generation step 441. A preferred embodiment of the present invention anticipates a proactive approach, in which target images are systematically sought to assemble a more complete composite model 360. Additionally, as will be discussed, a preferred embodiment of the present invention also anticipates pro-actively longitudinally tracking the quality of the composite model 360, as well as other metrics, that can indicate diminishing success in people recognitions tasks with images. Then, as pre-existing recognition models represent a subject's appearance with diminishing accuracy, new models can be generated, extending the persistence of recognition. While a preferred embodiment of the present invention preferentially anticipates generating composite models 360, because of their ability to handle various subject poses, simplified 2-D frontal models, using either an AAM or ASM approach, can also be supported. For example, the high frequency texture related data needed for the AAM approach, can be derived from the images during the image analysis step 441. Similarly, the data needed for a hair texture and shape model can also be derived. Other approaches that capture or model 3-D pose data of people can also be useful.

In the above discussions, the landscape of facial recognition models, and their relationship to a preferred embodiment of the present invention, has been described. However, their use in facial recognition in an image analysis system (see FIG. 1) can be clarified. In particular, when attempting to match an unrecognized face with a set of known faces, recognition software needs scaling or metrics to determine whether a match exists or not. As one aspect, the facial recognition system (software) needs to be "trained" to the feature matching statistics that represent a match or a mismatch. This training is facilitated by a ground truth image library that comprises image sets for a large group of labeled (known) faces. These images are analyzed to create generic (i.e. not targeted towards a small sub-set of individuals) facial recognition models, from which similarity data and similarity statistics can be derived. The sample group of imaged people should be diverse and representative of the demographics and conditions expected when the method is used.

Figure 6A:
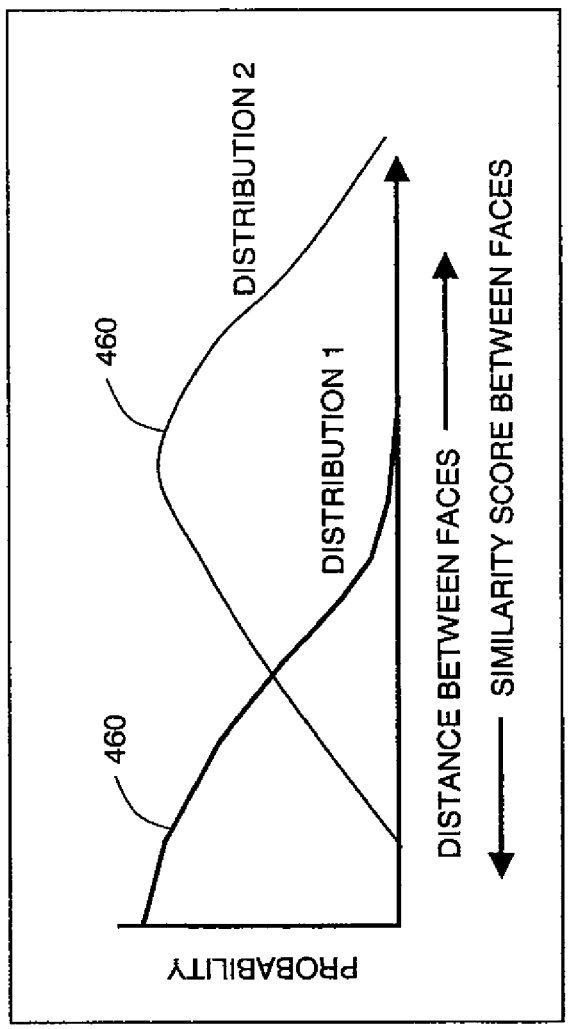
FIG. 6a is a plot depicting the concept of training or ground truth sets of similarity score distributions for comparing faces for facial recognition tasks.

It is not necessary to load every recognition software package or system with the ground truth image library, as the derived generic model data can be provided instead. The facial images and associated facial recognition models can be statistically analyzed to generate similarity scores. For example, as illustrated in FIG. 6a, similarity scores 460 can be computed from recognition models, for example by using an active shape facial feature point model (FIG. 5a) from which the summation of Euclidean or city-block distances between the corresponding feature points (1-82) can be calculated. Similarity score distributions 460 are probability distributions indicative of the matching of a known face and an unrecognized face. Distributions of similarity scores 460 are generated for the case where the target face matches the reference face (distribution 1), and for the case where the target face does not match the reference face (distribution 2), as shown in FIG. 6a. These distributions are based on data from a large set (thousands) or population of labeled exemplary facial images acquired during the training phase of the system. For example, the example data may contain "N" individuals with "M" exemplary images of each individual captured at different times under various pose and lighting conditions. Then, distribution 1 is generated by computing similarity scores 460 between each individual's reference recognition model and their "M" examples; and distribution 2 is generated by computing the similarity scores 460 between each individual's reference recognition model and the face images from all other individuals. The vertical axis of the distributions shows the probability of both faces being of the same individual for distribution 1, and the probability of both faces being of different individuals for distribution 2. From these distributions, it is possible to determine the probability that a given similarity score corresponds to a true match. The similarity score where distributions 1 and 2 cross is the equiprobable point, where there is equal probability of the two faces being from the same individual or from different individuals. At higher similarity scores than this point, it is more likely to be the same individual and at lower similarity scores it is more likely to be different individuals.

Figure 6B:
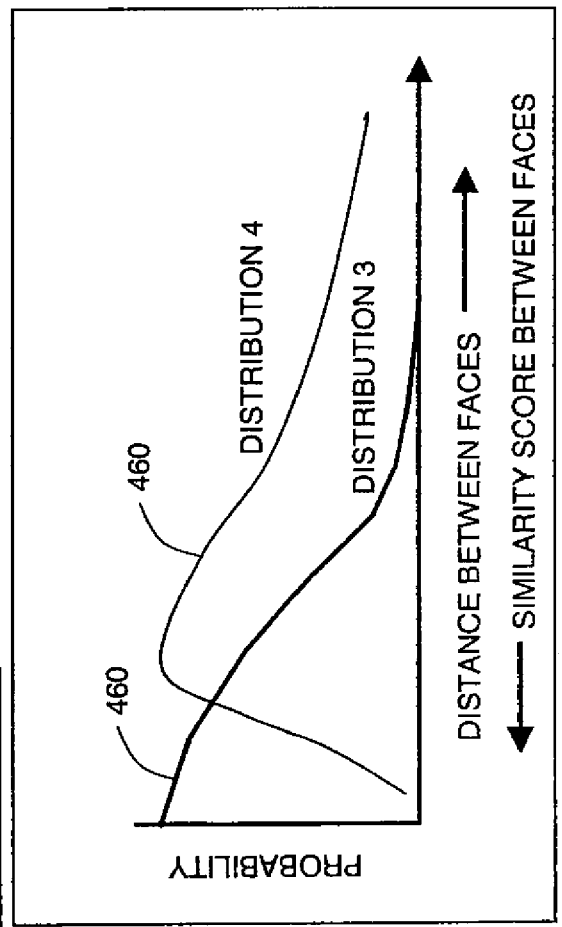
FIG. 6b is a plot depicting similarity score distributions for a multi-person household.

In the family photo domain, the face recognition problem entails finding the right class (person) for a given face among a small (typically in the 10s) number of choices. The system starts with the ground truth set of similarity score distributions (FIG. 6a), and recognition models (nominally composite models 360) for the typically small population of people relevant in a household (or family unit) created during the training phase. Once one or more recognition models (preferably composite models 360) have been gathered for a large number of individuals in the household, household similarity score distributions (distributions 3 and 4) can be generated, as illustrated in FIG. 6*b*. Generally, it is expected that the household distributions would show more overlap (i.e., it would be harder to tell people apart) than the ground truth distributions (FIG. 6*a*) in a household, due to similarities between related individuals (e.g., brothers). When household members look significantly different, the household similarity scoring can yield recognition results with greater confidence and reduced computing time than when using training set similarity score distributions. On the other hand, while individuals in households, such as spouses, may appear strikingly different, the opposite can also occur. For example, brothers or sisters, particularly if they are fraternal or identical twins, can appear very similar, to an extent that even confuses other family members. For example, if Susan and Ashley are sisters, their facial similarity can require additional analysis for person identification. This multi-class face recognition problem can be solved by using a pair-wise classification paradigm, in which two class classifiers are designed for each pair of classes. The advantage of using the pair-wise approach is that actual differences between two persons are explored independently of other people in the data set, making it possible to find features and feature weights that are most discriminating for a specific pair of individuals. The pair-wise approach can improve face recognition performance over standard approaches that use the same global feature set for all faces, in part because the number of facial features required for comparable performance is much smaller. Some face pairs can be completely separated using only one feature, and most require less than 10% of the total feature set. This is to be expected, since the features used are targeted to the main differences between specific individuals. The benefit of a composite model 360 is that it provides a wide variety of facial features for analysis. In addition, trends can be spotted by adaptive systems for unique features as they appear. This pair-wise approach is appropriate for the family photo domain, where the database includes a small number of primary individuals, among whom there are often family resemblances. Of course, common or similar pair-wise facial metrics may need to be used across multiple related households (linked households), such as for example, when identical twins are adults living independently from the original family (or household) unit. Also the use of pair-wise metrics is not literally limited to two individuals, but can be extended to larger numbers (such as identical or fraternal triplets) as appropriate.

With 'N' main individuals in a database, N(N−1)/2 two-class classifiers are needed. The classifiers can be based on facial feature point data (FIG. 5*a*), Eigenface data, texture data, or other facial data types. For each pair, the classifier uses a weighted set of features from the whole feature set that provides the maximum discrimination for that particular pair. This permits a different set of features to be used for different pairs of people. This strategy is different from traditional approaches that use a single feature space for all face comparisons. It is likely that the human visual system also employs different features to distinguish between different pairs, as reported in character discrimination experiments. This becomes more apparent when a person is trying to distinguish between very similar-looking people, twins for example. A specific feature can be used to distinguish between the twins, which differs from the feature(s) used to distinguish between a different pair. When a query face image arrives, it is evaluated against each of the N(N−1)/2 classifiers, to determine a positive (classifier present) or negative result. Classifier evaluation can also be done in combination, such as by "boosting", which is a method of combining a collection of weak classifiers to form a stronger classifier.

While similarity score distributions 460 are useful tools for determining an identity match or mismatch, they are not as useful for monitoring or reporting the probability that successful matching has occurred. This need can be fulfilled with Subject recognition confidence values 470. Subject recognition confidence values 470 (or confidence levels) are a measure of the confidence assigned to the value of an attribute (in this case, subject recognition), which are often expressed as a percentage (0-100%) or a probability (0-1). As part of a face recognition task of a given unidentified face, the probability of that face being a known person having a reference face (or model) can be determined from the similarity scores using the reference face, and using the distributions (distribution 1 and 2) provided with the system. One way to quantify the subject recognition confidence values 470 would be to compute the normalized ratio P(same)/(p(same)+P(different)), where P(same) is the probability from distribution 1 and P(different) is the probability from distribution 2 for the given similarity score on the horizontal axis. This would produce a confidence level of 50% at the equi-probable point, at or near 100% at high similarity scores and become smaller as the similarity score decreases (and the distance between faces increases).

However, as the appearance of a known subject (or user 100) changes over time, the accuracy of any current recognition models, including composite models 360, can be reduced relative to their use in recognition tasks. The appearance changes can be small or large, temporary, or long lasting. For example, a user 100 may grow a mustache or beard, and then subsequently shave it off a few months later. The confidence in a correct identification of the mustachioed user 100 in recognition tasks using a mustache-less recognition model as the reference or standard would likely be reduced. While a new recognition model may not be needed for such an appearance change, some changes will necessitate the generation of one or more new models. Multiple recognition models, including composite models may be maintained simultaneously to span a concurrent time period, to accommodate dramatic but temporary appearance changes (for example to cope with a woman wearing her hair down, or having it braided).

Figure 7:
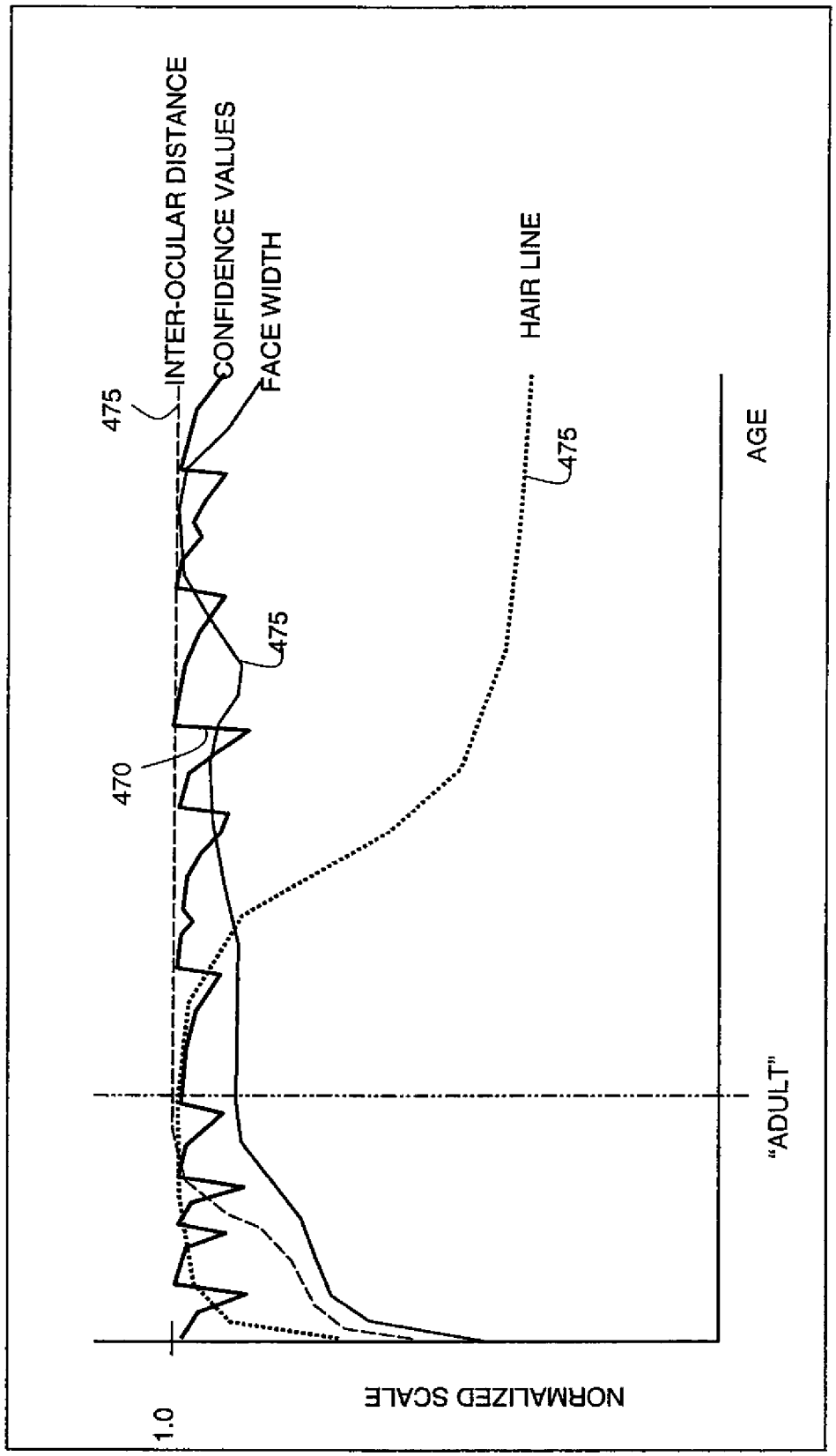
FIG. 7 is a longitudinal plot of changes in facial metrics and subject recognition confidence values over time.

The changes in recognition accuracy can be monitored over time, with the subject recognition confidence values 470, as shown in FIG. 7. The subject recognition confidence values 470 are initially determined or reset (target ~1.0) when new recognition models are created (step 441). As FIG. 7 then illustrates, the subsequent subject recognition confidence values 470 can decay after recognition model generation, as an individuals facial characteristics change. The decay or degradation can be gradual (trend-line) or abrupt, and can be tracked to identify and measure significant changes using metrics such as percent change, total change, threshold change, or rate (and duration) of change, relative to defined change detection criteria, as indicators that current recognition model reliability may be diminishing. Decay or change in the perceived success of performing recognition tasks can be measured using change metrics (as suggested above), which can be calculated during metrics calculation step 375, as part of either a photo recognition task (FIG. 1) or a recognition model update process 410 (FIG. 4). In this way, with this step of measuring for either abrupt or prolonged trend line changes in the subject recognition confidence values 470, the intelligent agent 420 can screen for appearance changes that have sufficient magnitude that a need for new recognition models can be identified.

As another aspect, the calculation and tracking of discrete facial features can also be valuable. For example, facial width can change appreciably with weight loss or gain, the hairline can change from balding, and wrinkles can occur with aging or sun exposure. Relevant facial features can be defined using calculations from the face points of the facial feature point model (FIG. 5*a*), as suggested with Tables 1 and 2. For example, specific facial metrics 475 for can easily be calculated (step 375) and then longitudinally tracked by the intelligent agent 420 (see FIG. 7). These facial metrics 475 can be used to track various features, including facial width, hairline, or special pair-wise attributes. As with the subject recognition confidence values 470, the intelligent agent 420 can monitor changes in significant facial metrics 475 using a percent change, total change, threshold change, or rate (and duration) of change as criteria or indicators that current recognition model reliability may be diminishing. This is useful because changes in sensitive facial features may be de-emphasized by the averaging process implied in the computation of a single-subject recognition confidence value 470 to represent an entire face. Alternately, for enhanced sensitivity, either the similarity scores 460 or the subject recognition confidence values 470 can be calculated using a weighted averaging technique to emphasize facial features that are commonly subject to change.

Various operational and conceptual aspects of a preferred embodiment of the present invention can now be clarified. For example, when consumers initially bring the recognition model update software, including the recognition model AI 420 into their residence, perhaps as a part of an electronic image device 210, the recognition model update system 200 will need to be initialized relative to the household. It can be expected that when a new group of users 100 first start to use the recognition model update software (system), that they would input various data, including user identity and semantic data. In particular, users 100 would supply identity and age information, relationship information, and at least frontal facial images (such as a passport photo image or mug shot) captured under bright generally uniform lighting conditions. These images may be generally similar to the reference images 358 of FIG. 5*b*. The input can be provided via keyboard, digital cameras, photo scanners, or other suitable methods. Scanned, digital, or e-mailed images of non-residents (such as grandparents or friends) could be included.

Typically, the intelligent agent (420) software would analytically derive facial recognition data from the images, such as the 82-feature (active shape) face point model 90 of FIG. 5*a*. Preliminary recognition models and reference images 358 would then be generated. Subsequently, a recognition model update process 410, using a recognition model update system 200, can occur, with these preliminary models supporting initial image capture 431. In a preferred embodiment, the process 410 would generate a complete set of target images and then recognition models, including 3-D composite models 360, for each household resident, as well as facial metrics 475 and subject recognition confidence values 470 appropriate for each individual user 100.

An image-capture event 400, using an electronic image device 210 with the recognition model update system 200 begins when a user 100, is detected (step 430) by motion detector 291. Motion detector 291 can include a sound sensor (microphone 270), a light intensity sensor (ambient light detector 276), or an optical sensor that detects motion, or a combination thereof. Camera 230 can also support motion detection, for example using image area histograms to detect presence and position. User tracking process 290, which can employ motion detector 291 and cameras 230, then tracks the location of the potential subject relative to the electronic imaging device 210. When it is determined that a potential subject has entered the field of view θ of camera 230, an initial image capture 431 occurs to acquire one or more initial images. Then, user identification process 431 accesses semantic identity data and employs face recognition software, audio recognition software, or other techniques to attempt to identify a known user 100. Again, to reduce analysis time, identification (step 432) can use reference images 358 instead of more detailed recognition models, such as ASM or composite models based on the 82-face point construct.

As other options for fast identification, the device 210 can use face detection algorithms that are optimized for face detection and face recognition and not necessarily for also supporting face modeling. Examples include commercial software such as from OKAO Vision, or freeware, such as MPT, from SourceForge.net, which utilizes OpenCV source code. These packages are also predicated on having frontal poses.

Once a known user 100 has been identified using images obtained during initial image capture 431, status tests 433 can determine whether new images for recognition modeling are needed or not to enable persistence in recognition tasks. While a negative answer causes image capture to stop (step 434), an affirmative answer initiates the image capture loop 425, which is an interactive process of image capture (435), image testing (436) and subject tracking (290). Most simply, an affirmative answer can occur if the most recent recognition models (particularly composite model 36) have become dated, relative to an age-based schedule, such as the one suggested in Gallagher '624. An affirmative answer can also occur if the intelligent agent 420 has determined that the most recent recognition models are no longer adequate, based on analysis of the currently acquired images (steps 431 and 290), as measured by changes in subject recognition confidence values 470 or facial metrics 475 (step 375). Additionally, if the recognition model update process 410 is attempting to complete one or more recognition models, but has an incomplete set of target images, an affirmative answer can be provided. The answers, whether affirmative or negative are sent through decision node 445, leading to stopped capture (step 434) or the image capture loop 425. As another option, users 100 may request that a new recognition model be created.

The age-based schedule approach suggested by the commonly assigned Gallagher '624 application can be considered in more detail. As an exemplary age progression, new recognition models can be sought every 4 months for child year 0-1 years old, every 6 months for a child 1-3 years old, and yearly for a child or youth 4-16 years old. Thereafter, the scheduled timing may be every 2 years between ages 17-23, and once every 5 years subsequently. During the status tests step 433, a users current age can be compared to the age progression schedule to determine whether new recognition models are needed or not.

However, as stated previously, an age-based schedule approach does not proactively identify and respond to significant changes in a user's appearance that will diminish the success rate of photo-recognition for that individual. As an example, a user 100 may experience a relatively sudden facial feature change related to unique facial features, such as the removal of a mole, scar(s), birthmark, loss of hair, or the use of eye glasses. Feature segmentation and extraction algorithms can run during the identify user or test images steps (432 and 436 respectively) locate these features in the captured images. The intelligent agent 420 can apply a significance test using subject recognition confidence values 470 or facial metrics 475 to determine whether changes in unique facial features warrant the creation of an updated recognition model(s). The answers, affirmative or negative, can be supplied as input for status tests step 433. Alternately, for less dramatic changes (such as growth of a mustache on a user), it can be sufficient for the intelligent agent 420 to augment an existing recognition model with metadata to denote the change in facial appearance and date. As another option, multiple recognition models (including multiple composite models 360) may be concurrently maintained and used for an individual to handle dramatic cosmetic changes (such as visually significant, but temporary hair styles). As another approach for dramatic, but temporary appearance changes, such as the growth and later removal of a beard, the AI 420 may determine that a pre-beard recognition model can still be used reliably rather than generating a new one.

Other facial features, that can change but which may not be as unique or obvious as a birthmark or a wound, can also affect person-in-image recognition tasks. As example, facial width can change appreciably with weight loss or gain, the hairline can change from balding, and wrinkles can occur with aging or sun exposure. FIG. 7, which is a longitudinal normalized plot versus age, illustrates hairline and face width changes over time with facial metrics 475. The hairline can be tracked using data derived from facial feature points 58-66 (see FIG. 5a), while facial width can be tracked using the distance between facial feature points 79-81 and 68-70. As another example, facial wrinkles can be tracked using ASM texture measures for surface roughness and pattern analysis. Pair-wise facial classifiers for distinguishing between two similar looking people can also be tracked this way. FIG. 7 also illustrates a facial metric 475 plotted for the interocular distance (distance between facial feature point 0-1). As past adolescence, the interocular distance is nominally constant throughout life, the associated facial metric 475 can be used as a reference or normalization value for other facial distance or area based facial metrics.

FIG. 7 also directly illustrates the concept of the subject recognition confidence value 470 changing over time. The intelligent agent 420 calculates a new base value (hopefully very close to 1.0) after the completion of new recognition models for an individual user 100 via recognition model update process 410. Then as subsequent images of that user are analyzed via image analysis system 300 (via steps 340 and 375) or during an image capture event 400 associated with a recognition model update process 410 [via status tests, steps 433 and 375 (see FIGS. 4 and 8)], new subject recognition confidence values 470 can be calculated. The intelligent agent 420 can track gradual changes in subject recognition confidence values 470 over time (as suggested by FIG. 7). Then as a user's appearance changes over time, whether due to aging effects, dieting, medical conditions, or other reasons, the tracked subject recognition confidence values 470 can be reduced. At some point, for example, when subject recognition confidence values 470 are reduced (for example to ~80%) and recognition persistence is diminishing, the intelligent agent 420 can determine that new images are needed for generation of new facial recognition models. The status input to status tests step 433 can then be changed "yes" to indicate that new images are needed for recognition model generation. FIG. 7 conceptually illustrates the subject recognition confidence values 470 can change relatively quickly during childhood and youth, as previous recognition models become dated and new ones are generated. Although FIG. 7 does not depict this, multiple subject recognition confidence values 470 may be tracked simultaneously, if multiple recognition models are being concurrently maintained and tracked. Each recognition model (such as each concurrent composite model 360) can have associated subject recognition confidence values 470.

As FIG. 7 illustrates, longitudinal tracking of subject recognition confidence values 470 and facial metrics 475 can document significant changes in a users facial appearance that can effect person-in-picture recognition tasks, and thus reduce the success and certainty of the tasks, as well as the useable lifespan of the supporting recognition models. While it is valuable to pro-actively identify a need for new recognition models, and then generate them, unnecessary recognition model generation or churn is to be avoided, to reduce computational needs and reduce confusion. It is desirable to reduce new recognition model generation due to transitory non-repeating events, such as the wearing of a costume by a user 100. The status test step 433 can apply logical tests to observed changes in subject recognition confidence values 470 or facial metrics 475, based on the amount of change, the temporal abruptness of the change, and the duration (for example, a sustained change that spans weeks of images) of the change to determine whether new recognition models need to be generated. In addition to these noise reduction techniques, some changes (such as the growth of a mustache or the wearing of glasses), even if of a prolonged nature, can be accommodated by amending an existing recognition model 350 with a metadata tag or with an auxiliary facial model file (an auxiliary recognition model 365) which accounts for the new feature. In the case of more dramatic, but potentially transitory or repeating facial appearance changes, particularly relative to hairstyles or beards, multiple recognition models can be needed concurrently. The recognition model update process 410 can also generate supplementary concurrent models as needed, and test them against each other using similarity scoring to determine if sufficient added value is provided by each such model.

Positive status tests lead to the image capture loop 425, in which image testing (436) basically determines whether the captured images of user 100 correspond to the needed poses and have the requisite lighting and image quality. The idea of subject pose variation is illustrated in FIG. 5d, with a range of horizontally oriented common poses (including frontal, three-quarter front, and profile), as defined and understood by cinematographers. However, in the case of automated subject recognition, significant variations in facial pose are more precisely defined than in cinematography. Model-based techniques for pose estimation typically reproduce an individual's 3-D head shape from an image and then use a 3-D model to estimate the head's orientation. For example, pose estimation can be completed using the approach described in the previously discussed paper by Shimizu et al. Head pose has three angular components: yaw, pitch, and roll. Yaw refers to the angle at which a head is turned to the right or left about a vertical axis. Pitch refers to the angle at which a head is pointed up or down about a lateral axis. Roll refers to the angle at which a head is tilted to the right or left about an axis perpendicular to the frontal plane.

Using such methods, the pose angle can estimated for each captured image (from step 435) during the image tests (step 436). In order to generate a robust 3-D recognition model (composite model 360) of a subject, the collection of image acquired during image capture loop 425 need to span a wide range of angles. While a full set of images, spanning 360 degrees around a subject's head (yaw) is the ultimate, in practice, a range of images spanning frontal to left and right side profile orientations will enable a 3-D composite model useful for most recognition tasks. As suggested by Zhao and Chellapa, the stepping angle between image poses should preferably be ~5 degrees. Of course, facial images provided by consumers for facial recognition tasks will have various amounts and directions of head tilt. In general, recognition models and face-in-image recognition software can handle some head tilt. Also people's heads will naturally tend to align vertically anyways. Tilt is more of a problem with random still images but, by undertaking face modeling and recognition tasks with image collections over time the impact of this issue should be reduced. Potentially, users 100 can be asked to deliberately rotate their heads to assist target image acquisition. Similarly, facial images collected under different lighting conditions are needed for creating a robust facial model. Blanz and Vetter have used 22 different lighting conditions. However, all these conditions may not occur in the capture situation for a given user. Images are collected under the subset of lighting conditions that likely occur (for example, light through the window, overhead light on and so on).

The image testing (step 436) can also assess the quality of the newly captured images. General guidelines for image quality address concerns such as size, lighting, and image contrast. For example, for a frontal image, the minimum image size should provide at least 100 pixels spanning the interocular distance, and preferably <300 pixels. The requirements for image brightness are modest, as signal levels should neither be saturated or too low (to minimize noise), but the images are not being judged for perceptual impact. For example, average pixel signal levels at ~20% of pixel electron well capacity can be used. The image contrast, which compares the signal range from dark regions to highlights needs to be adequate to find facial features, including hair. Image contrast ratios of ~100-200:1 should suffice. Another image quality metric can quantify the amount of illuminant shadowing or non-uniformity on the face, to determine whether it exceeds modeling capabilities. The intelligent agent 420 can combine these metrics into an overall capture quality metric that indicates whether is good enough to use for recognition model generation.

Image quality metrics can also be used in the computation of subject confidence values 470. As one approach, separate set of similarity score distributions 460 (FIG. 6) would be provided for a few discrete levels of capture quality. Given a new facial image with quantified image quality metrics, the similarity score distributions 460 corresponding to sufficiently equivalent capture conditions would then be used in the recognition process. Another alternative is to compute subject recognition confidence values 470 as earlier, and use a capture quality metric to modify the confidence value (e.g. lower the confidence value for faces captured under poor capture conditions).

A large labeled ground truth library used to assemble similarity score (460) distributions should include images of people taken under different illumination conditions. Blanz and Vetter use 22 different lighting conditions per individual, encompassing different illuminant and shadowing combinations. According to Zhao and Chellappa, Eigenhead approximations of 3-D head models can be obtained from images in ground truth libraries. For a new face image, its 3-D head model can be approximated as a linear combination of the Eigenheads and then used to determine the light source. Generally, a consumer's system will see a subset of the lighting conditions possible, and the 22 variations captured in a library span a larger range of possibilities. For example flash fired illumination from top of head is unlikely. Thus the databases associated with AI 420 can include images captured with the different light sources/circumstances encountered for that system such as: sunlight from window, room lighting of various sorts (fluorescent, incandescent, etc.), diffuse ambient lighting, etc. These various illuminants can create differences in subject shadowing and facial color. The impact of shadowing is factored into the process via the ground truth library and related similarity scores. The color differences are minimized, as color is generally not used in recognition models, and color images will be converted to gray scale. Most simply, camera 230 can be a monochrome camera. Alternately, camera 230 can be a color-sensitive image capture device, and color to grey scale conversion can occur within the camera immediately after image capture. Finally, color to grey scale conversion can occur during image normalization (step 439), as a precursor step to grey scale normalization.

It is noted that the majority of photo recognition tasks will assess facial images without pronounced shadowing. Therefore the image capture loop 425 should acquire target images of a user 100 over a range of pose orientations in which lighting non-uniformity is not visibly detectable. When circumstances allow frontal pose subject image data to be collected with sufficient uniformity, the intelligent agent 420 can generate AAM texture data as a complement to the nominal target composite model 360.

The target images acquired within the image capture loop 425 that meet the image quality metrics and the subject pose targets are saved and tagged (step 437) for later use. The following subject image review process (step 438) is a function of AI 420 that supports image acquisition and recognition model generation by verifying that sufficient target images are available for creating recognition models. Target image acquisition status is provided back to status tests step 433 as input (yes/no, poses needed, date). A sufficient collection of poses would include the front view, views facing left and right, views facing up and down and the two profile views. Additional poses may include more extreme positions such as the back of the head. An affirmative answer leads to image normalization 439, which is a precursor step to deriving reference feature data (ground truth face point data for a subject or user 100) appropriate for person-in-image recognition tasks.

Image normalization 439 is basically tasked to overcome a number of problems that an unobtrusive system can encounter (changes in room light, distance and direction of the user from the capture device). As a first example, size normalization is important for scaling images and generating recognition models. In particular, for a frontal view the interocular distance (shown as reference feature 92 in FIG. 5*b*) is useful, and is used as a denominator term in some Table 2 calculations. The derived distance between the eyes 130 for a newly captured image can be compared to the expected sizing information obtained from the reference images 358 generated during the initial system set-up. Corrective factors can be then derived using pose estimation and applied to compensate for parallax errors related to the subject pose during image capture. As subject pose changes to a profile view, where the far eye is significantly or entirely hidden, alternate facial feature reference distance may be needed for size normalization. For example, a distance from the eye to the auditory canal may be used.

Image normalization step 439 can also include gray scale normalization. As noted previously, for recognition tasks based on facial and head image data; color data is generally not important; and gray scale data is sufficient. Additionally, color related variations are accounted for by assembling a ground truth library of images and derived similarity score distributions under various lighting conditions. Thus, the input images can simply be converted to a grey scale, avoiding color space calibrations and corrections required for color-based recognition models. In the instances that acquired target images fall within target nominal lighting conditions, the grey scale conversion can be sufficient, and gray scale normalization can be avoided. However, when the image capture conditions are more variable, it can be necessary to normalize the gray scale images to common tone scale distributions. However, it is important that image normalization not obscure or reduce other image texture attributes such as the frequency, direction, and patterning of image features, because texture features are used in recognition modeling, including to locate the 82 face points of FIG. 5a.

Image normalization (step 439) leads into the linked image analysis and recognition model generation steps (440 and 441 respectively). As an example, following the ASM approach, the images are analyzed to map the generic facial model of FIG. 5a onto a given user's face. The appropriate distances, per Tables 1 and 2 can be determined by measuring the distance between relevant facial feature points in pixels, with normalizing by dividing by the interocular distance given in pixels. The target distance can also be scaled to real life using the known distance in millimeters. For example, the typical interocular distance for adult humans is ~60 mm.

In the case that recognition model generation (step 441) produces a 3-D composite model 360, input image analysis begins with identifying edge curves (e.g., the contours of eyes, lips, eyebrows, and ears) defined for the 3-D model using the feature face point model of FIG. 5a, and the facial features defined in Tables 1 and 2. After establishing a correspondence between the edge curves in the model and an input image, the head pose is estimated by iteratively adjusting the 3-D model through a variety of pose angles and determining the adjustment that exhibits the closest curve fit to the input image The pose angle that exhibits the closest curve fit is determined to be the pose angle of the input image. Pose angle estimation can be completed for each of the available model generation images. Three-D models can be produced from one or several images with the accuracy increased with the number of images combined with head sizes large enough to provide sufficient resolution.

As stated previously, a preferred embodiment of the present invention can support generation of other recognition models 350, aside from composite models 360, including the Pentland Eigen model, the active shape (ASM) model and the active appearance model (AAM). Since these models are 2-D models, a separate model can be created for each pose, and the ensemble of 2-D models over all poses is the overall model for the individual. The model from this ensemble that is used for matching a given face is based on the pose estimate of the face. In the case of the Yacoob, hair model or eyeglasses characterization, textural attributes, such as edges and facial hair, are identified from features that have known characteristics and locations, and can be efficiently located on a given user. These additional attributes can be used in addition to the geometric models described earlier to enhance the recognition model.

Additionally, the linked image analysis and recognition model generation steps (440 and 441 respectively) are tasked with tabulating updated subject recognition confidence values 470 associated with the quality of newly generated recognition models. Nominally, after the generation of one or more recognition models for an individual, the associated subject recognition confidence values should return to unity, or close thereto, as illustrated in FIG. 7. Potentially, each maintained recognition model, such as one or more composite models 360, an active appearance model (AAM), or a Pentland Eigen model, can have separately tracked associated subject recognition confidence values 470. Calculations for other tacked facial metrics 475 can also be updated and compared to prior values.

As previously described, a preferred embodiment of the present invention anticipates a method for enabling persistence in the recognition of individuals in images in which subject recognition confidence values 470, facial metrics 475, or other facial classifiers, can be accumulated, longitudinally tracked, and analyzed to determine whether subject recognition success is deteriorating or is likely to do so. New indicative status data regarding these factors can be acquired (at metrics calculation steps 375) from either an image analysis system 300 or the recognition model update process 410. In the previous description, an identified need for a new recognition model has prompted an electronic image device 210, having a camera 230, to acquire the needed images of users 100. However, as an alternative approach, an identified need can be determined during an image analysis system 300 using new images entering a photo collection, and then recognition models can be generated using these and other images without pro-active camera captured images.

Figure 8:
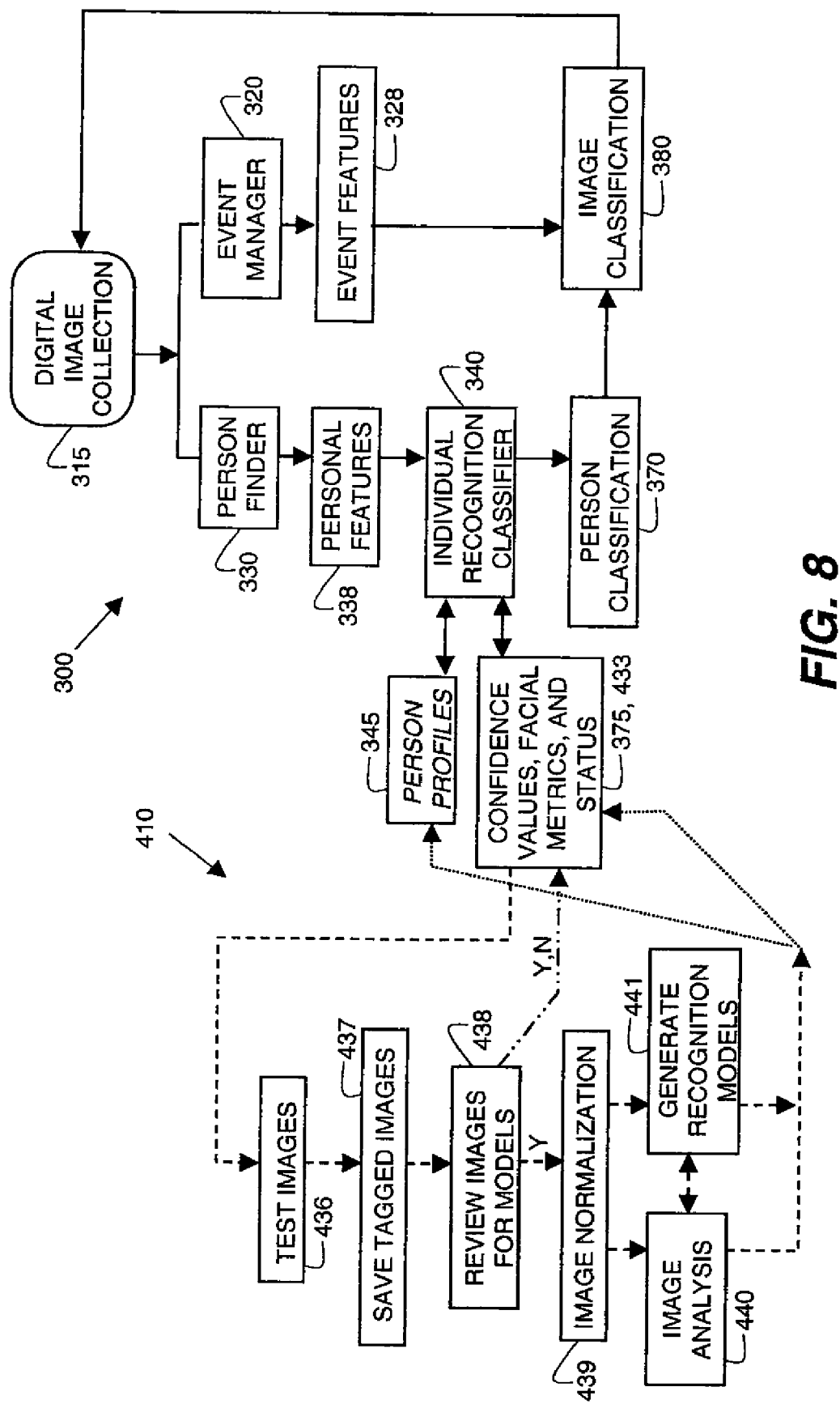
FIG. 8 is a diagram depicting an image analysis photo recognition system embodiment interacting with a recognition model update process flow embodiment of the present invention.

In particular, FIG. 8 shows an interaction of an image analysis system 300 and a recognition model update process 410. in this instance, new images are analyzed by image analysis system 300 to execute a person-in-picture person recognition task. As with FIG. 1, system 300 utilizes a person finder 330, event manager 320, and individual recognition classifier 340. For example, the user 100 may be adding new images including: subjects (such as household residents or non-residents), and non-subjects, to an existing photo collection. As previously, individual recognition classifier 340 can provide a person classification 370 of subject [or user—such as Aaron (son)], non-subject, or uncertain. When an individual or user 100 is successfully identified by individual recognition classifier 340 using person profiles 345, subject recognition confidence values 470 and other facial metrics 475 can be calculated and then analyzed (at steps 375 and 433) for abrupt or trend line longitudinal changes. Then when these metrics indicate that recognition models 350, such as composite models 360; are deteriorating or changed significantly, a recognition model update process 410 can begin. However, rather than acquiring new images using an electronic image device 210 having a camera 230, the new images can be obtained from images subsequently provided through image analysis system 300. As images of an individual become available, they can be tested for need and adequacy (step 436) and then stored (step 437) when appropriate. Image review (step 438) can determine whether sufficient images are available to create useful recognition models, and pass a status notifier (step 433). When sufficient adequate images are available; recognition models are generated by AI 420; according to image normalization (step 439), image analysis (step 440), and recognition model generation (step 441). New recognition models, such as composite models 360, can be supplied to person profiles 345, while new subject recognition confidence values 470 and facial metrics 475 can be supplied (step 375).

The overall process outlined in FIG. 8 provides a method to derive recognition models 350 of people using image collections supplied by users 100. For example, the FIG. 8 process can use the methods of the commonly assigned Lawther '343 to derive composite models 360 or the methods of commonly assigned Gallagher '624 to generate AAM models. However, unlike these applications, and particularly Gallagher '624, the FIG. 8 process does not only rely on time and aged based schedules to determine when to generate new recognition models, but instead uses a pro-active tracking and analysis approach based on subject recognition confidence values 470 or facial metrics 475 to determine a need to generate new recognition models 350. Then the process of FIG. 8 provides the means to pro-actively generate new recognition models in response to the defined need. As this approach does not use an electronic image device 210 having a camera 230 to proactively acquire images of the users 100, people may find it less invasive with respect to privacy concerns. However, the recognition models 350 generated by the FIG. 8 process can be incomplete and utilize reduced image quality source data, reducing their overall effectiveness. Time lags in image availability can also reduce model quality and certainty. These issues can be reflected in lower subject recognition confidence values 470 associated with new recognition models (for example, only ~0.92 instead of ~1.0). It is also anticipated that a hybrid approach can be used, in which new recognition models 350 are generated by a combination of pro-active image capture (the FIG. 4 process) and model derivation from images supplied by users (the FIG. 8 process). A hybrid approach (or the process of FIG. 8) is useful because it enables users 100 to directly support the recognition models 350 by providing source images (scanned, just captured, e-mailed) of individuals of interest to them. This may be particularly useful for individuals who are non-residents and infrequent visitors (such as distant relatives or friends) who are unlikely to be imaged by a camera 230 that supports the recognition model update process 410 described by FIG. 4.

As suggested previously, it is expected that users 100 may have privacy concerns with preferred embodiments of the method and apparatus of the present invention. For example, as people may be concerned that an electronic image device 210 having a camera 230, such as the digital picture frame depicted in FIG. 2b, is capturing pictures of them. To address this, visual or audio cues can be provided to indicate that image capture is occurring. Image capture can also be prevented by a visible hard physical stop placed over the camera 230. Privacy controls can also determine which individuals are considered subjects, for whom recognition models are being created, as well as controlling access to the recognition models and the longitudinally tracked data.

It is also anticipated that users 100 can use the methods (represented by FIG. 4 or 8) or system (represented by FIG. 1, 3, or 8) of several preferred embodiments of the present invention to acquire images or facial models that may be used as source data to create or update imagery for Internet use. For example, users 100 may use the output to create 3-D images of himself or herself for portrayal on Facebook or equivalent. Similarly, users 100 may use the output to create photo-realistic avatars for use in metaverses, such as Second Life.

As another aspect, the device (such as depicted in FIG. 3) of a preferred embodiment of the present invention can be compared to image-based surveillance and security systems. Security and surveillance systems are known in the prior art, and representative examples include U.S. Pat. No. 6,111,517, by Atick et al.; and U.S. Pat. No. 7,114,079, by Cook et al. Typically, surveillance systems, accompanied by automation or human observation, actively watch, display, and record image data of an area of interest. Many surveillance systems enable overt or covert observation of an area without recognizing individuals therein, although the individuals or their activities may be automatically classified. Many such systems are keyed to identify faces, voices, or other cues indicative of human activity within an area. In the case of security screening systems, face detection software is used to compare facial images of passers-by (or airline traveler's, for example) to facial images of people from predefined watch lists. While many security and surveillance systems use face detection and recognition algorithms and databases to perform their tasks, they use pre-existing facial images or facial image data. That is, unlike preferred embodiments of the present invention, the security and surveillance systems do not anticipate a need to maintain accurate facial models of a small select group of individuals, such as the individuals in a residence. As such, these systems do not analyze new facial images to determine subject recognition confidence values 470 and facial metrics 475 which are then longitudinally tracked to assess changes in facial appearance. Likewise, the security and surveillance systems do not analyze such longitudinally tracked data to determine a need to initiate acquisition of multi-pose images of individuals (users) for the creation of new complete facial recognition models of the individuals. Finally, these security and surveillance systems do not respond to an identified need for new recognition models 350, and as such do not then manage a process for generating new facial recognition models using the accumulated images.

Preferred embodiments of the present invention have principally been described relative to enabling persistence in recognition of people in images using facial and head image data. As noted previously, other data can be used, including voice and gait data, which can be particularly useful when analyzing video imagery. For example, voice data for a user 100 can be collected using a microphone 270 or from the audio track of a video input. The audio can be analyzed to derive statistically valid voice recognition metrics for attributes such as frequencies, pitch, voicing rate, and segment durations. Additionally, prosody, which is the non-linguistic cues that a speaker uses to guide listeners and signal intent, can also be analyzed. Prosody includes such factors as voice pitch, pacing, and loudness and can occur consciously or unconsciously. It is noted that speech analysis targeting voiced speech, which has a strong harmonic spectral structure (basically the vowels), can be a fast and efficient approach. To enable this, various supporting technologies, such as noise suppression and echo cancellation may be needed in the audio processing.

The invention has been described in detail with particular reference to certain preferred embodiments thereof, but it will be understood that variations and modifications can be effected within the spirit and scope of the invention. It is emphasized that the apparatus or methods described herein can be embodied in a number of different types of systems, using a wide variety of types of supporting hardware and software. It should also be noted that drawings are not drawn to scale, but are illustrative of key components and principles used in these embodiments.

| PARTS LIST | |
| --- | --- |
| θ | Full Angle |
| λ | Light |
| 1-82 | Facial Feature Points |
| 90 | Face Point Model |
| 92 | Reference Feature |
| 100 | User (or Individual or Person) |
| 125 | Face |
| 130 | Eyes |
| 135 | Mouth |
| 140 | Nose |
| 200 | Recognition Model Update System |
| 210 | Electronic Image Device |
| 220 | Computer |
| 222 | Memory |

PARTS LIST (continued)

| Number | Description |
|---|---|
| 224 | Communications Controller |
| 230 | Image Capture Device (or Camera) |
| 235 | Image Processor |
| 240 | Display |
| 245 | Screen |
| 250 | Frame |
| 255 | Housing |
| 260 | User Interface Controls |
| 265 | User Interface |
| 270 | Microphone |
| 272 | Speaker |
| 274 | Motion Detection Sensor |
| 276 | Ambient Light Detector |
| 280 | System Controller |
| 285 | User Identification Process |
| 290 | User Tracking |
| 291 | Motion Detection |
| 292 | Voice Detection |
| 293 | Face Detection |
| 294 | Pose Detection |
| 295 | Lighting Detection |
| 300 | Image Analysis System |
| 310 | Database |
| 315 | Digital Image Collection |
| 320 | Event Manager |
| 322 | Capture Time Analyzer |
| 324 | Event Features Detector |
| 326 | Event Features Classifier |
| 328 | Event |
| 330 | Person Finder |
| 332 | Person Detector |
| 334 | Face Detector |
| 336 | Feature Detector |
| 338 | Personal Features |
| 340 | Individual Recognition Classifier |
| 345 | Person Profiles |
| 350 | Recognition Models |
| 352 | Facial Model |
| 354 | Hair Model |
| 356 | Clothing Data |
| 358 | Reference Images |
| 360 | Composite Model |
| 365 | Auxiliary Recognition Model |
| 370 | Person Classification |
| 375 | Metrics Calculation Step |
| 380 | Image Classification |
| 400 | Image Capture Event |
| 410 | Recognition Model Update Process |
| 420 | Recognition Model Intelligent Agent (AI) |
| 425 | Capture Loop |
| 430 | Detect Person |
| 431 | Initial Image Capture |
| 432 | Identify User |
| 433 | Status Tests |
| 434 | Stop Capture |
| 435 | Recognition Model Image Capture |
| 436 | Image Capture Tests |
| 437 | Tag And Save |
| 438 | Review Subject Images |
| 439 | Image Normalization |
| 440 | Image Analysis |
| 441 | Model Generation |
| 442 | Delete Image Files |
| 443 | Query User |
| 445 | Decision Node |
| 450 | Recognition Models Database |
| 460 | Similarity Scores (or Similarity Score Distributions) |
| 470 | Subject Recognition Confidence Values |
| 475 | Facial Metrics |
| 480 | Confidence Calculations |

What is claimed is:

1. A computer implemented method for enabling computer recognition of a particular person in images, comprising the steps of:

analyzing one or more facial images of a person using a facial recognition model associated with the person to identify the person and to determine changes in facial appearance of the person;

calculating a subject recognition confidence value for the person responsive to the facial recognition model and the determined changes in facial appearance present in the one or more facial images, wherein the subject recognition confidence value is calculated from similarity score distributions, the similarity score distributions being probability distributions indicative of the probability of matching instances of the same person and the probability of matching instances of different persons;

comparing the calculated subject recognition confidence value for the person to prior subject recognition confidence values calculated using prior images of the person to identify changes in the subject recognition confidence values;

analyzing the identified changes in the subject recognition confidence values of determine whether a new facial recognition model for the person should be generated based on the determined changes in the facial appearance of the person;

generating the new facial recognition model from current of subsequent images of the person is it is so determined by the step of analyzing the identified changes; and using the new facial recognition model for subsequent person recognition tasks.

2. The method according to claim 1 wherein the step of analyzing the identified changes includes tracking changes in the subject recognition confidence values over time to identify significant changes in the confidence values.

3. The method according to claim 2 further comprising the step of measuring significant changes in the subject recognition confidence values relative to change detection criteria including total change, percent change, threshold change, rate of change, or duration of change.

4. The method according to claim 1 wherein the step of calculating the subject recognition confidence value includes using normalized ratios of probabilities calculated from the similarity score distributions.

5. The method according to claim 4 wherein the similarity score distributions are household similarity score distributions determined for a set of persons that are members of a household.

6. The method according to claim 5 wherein the step of calculating similarity score distributions includes-using-pairwise facial classifiers for one or more pairs of individuals in the household.

7. The method according to claim 1 further comprising the step of analyzing the facial images relative to one or more defined facial metrics, wherein the facial metrics are associated with predetermined facial features that are tracked using a facial recognition model.

8. The method according to claim 1 further comprising the step of acquiring the plurality of facial images of the person from an image capture device, an image collection, or a combination thereof.

9. The method according to claim 1 wherein the facial recognition model is selected from a 3-D composite model, an active shape model, an active appearance model, or combinations thereof.

10. The method according to claim 1 wherein at least two different facial recognition models are concurrently provided for the person, each facial recognition model corresponding to a different appearance condition of the person.

11. The method according to claim 1 wherein the new facial recognition model is generated by updating the existing facial recognition model to include metadata that is indicative of the changes in appearance of the person or to include an auxiliary facial recognition model that is indicative of the changes in appearance of the person.

12. A computer implemented method for enabling computer recognition of a particular person in images, comprising the steps of:
 acquiring at least one digital facial image of the person using an image capture device;
 analyzing the at least one digital facial image of the person relative to a predetermined facial recognition model associated with the person to identify the person and to determine changes in facial appearance of the person;
 calculating a subject recognition confidence value for the person responsive to the facial recognition model and the determined changes in facial appearance present in the at least on facial image, wherein the subject recognition confidence value is calculated from similarity score distributions, the similarity score distributions being probability distributions indicative of the probability of matching instances of the same person and the probability of matching instances of different persons;
 comparing the calculated subject recognition confidence value for the person to prior subject recognition confidence values calculated using prior images of the person to identify changes in the subject recognition confidence values;
 analyzing the identified change in the subject recognition confidence values to determine whether a new facial recognition model for the person should be generated based on the determined changes in the facial appearance of the person;
 acquiring at least one additional facial image of the person using the image capture device;
 generating the new facial recognition model using at least the one additional facial image of the person; and
 using the new facial recognition model for subsequent person recognition tasks.

13. The method according to claim 12 wherein the step of analyzing the identified change includes tracking changes in the subject recognition confidence values over time to identify significant changes in the subject recognition confidence values.

14. The method according to claim 12 wherein the step of calculating the subject recognition confidence value includes using normalized ratios of probabilities calculated from the similarity score distributions.

15. The method according to claim 12 further comprising the step of analyzing the facial images relative to one or more defined facial metrics, wherein the facial metrics are associated with predetermined facial features that are tracked using a facial recognition model.

16. The method according to claim 12, wherein the image capture device is a device selected from an electronic picture frame, a video phone, a web camera, or a digital camera.

17. The method according to claim 12 wherein the step of generating the new facial recognition model comprises the step of normalizing the facial images acquired by the image capture device relative to grey scale and size.

18. The method according to claim 12 wherein the additional facial image of the person are tested to determine whether they have an image quality level sufficient for use in generating the new facial recognition model.

19. The method according to claim 12 wherein the facial recognition model is selected from a 3-D composite model, an active shape model, an active appearance model, or combinations thereof.

20. The method according to claim 12 further comprising the step of identifying whether the person is a subject for whom a facial recognition model exists or a non-subject for whom a facial recognition model does not exist.

21. The method according to claim 20 wherein the step of identifying whether the person is a subject or non-subject includes the step of utilizing a reference image comprising selected facial features to represent the facial appearance.

22. The method according to claim 20 further comprising the steps of providing the image capture device with a microphone that enables capture of voice characteristics of the person, and analyzing the voice characteristics to provide recognition cues for the person.

23. A non-transitory tangible computer readable storage medium storing executable instructions for causing a processor to perform a method for enabling computer recognition of a particular person in images, said method comprising:
 accessing a facial recognition model for a person and associated prior subject recognition confidence values calculated using prior images of the person from processor-accessible memory;
 analyzing one or more facial images of the person using the facial recognition model for the person to identify the person and to determine changes in facial appearance of the person;
 calculating a subject recognition confidence value for the person responsive to the facial recognition model and the determined changes in facial appearance present in the one or more facial images, wherein the subject recognition confidence value is calculated from similarity score distributions indicative of the probability of matching instances of the same person and the probability of match instances of different persons;
 comparing the calculated subject recognition confidence value for the person to the prior subject recognition confidence values to identify changes in the subject recognition confidence values;
 analyzing the identified changes in the subject recognition confidence values to determine whether a new facial recognition model for the person should be generated based on the identified changes in the appearance of the person;
 generating the new facial recognition model from current of subsequent images of the person if it is so determined by the step of analyzing the identified changes; and
 storing the new facial recognition model in the processor accessible memory for use with subsequent person recognition tasks.

24. A system comprising:
 an image capture device for capturing facial images of a person;
 storing memory coupled to the image capture device for storing the captured facial images of the person. a previously generated facial recognition model for the person, and one or more prior subject recognition confidence values calculated using prior images of the person;
 means for calculating a subject recognition confidence values for the person responsive to the facial recognition model and the determined changes in the facial appearance present in the one or more captured facial images, wherein the subject recognition confidence value is calculated from similarity score distributions, the similarity score distributions being probability distributions indicative of the probability of matching instances of the same person and the probability of matching instances of different persons;

means for comparing the calculated subject recognition confidence value to the prior subject recognition confidence values to identify changes in the subject recognition confidence values and to determine whether a new facial recognition model for the person should be generated based on the determined changes in the facial appearance of the person; and means for generating a new facial recognition model using current or subsequent images of the person if a need is so determined by the comparison means.

25. A computer implemented method for enabling computer recognition of a person in images, the person being a member of a household including a plurality of persons, comprising the steps of:

generating facial recognition models for two or more persons in the household;

generating at least one pair-wise facial classifier for at least one pair of persons in the household, the pair-wise facial classifier using at least one facial feature that discriminates appearance differences for the pair of persons;

analyzing one or more facial images of the person using the facial recognition models and the pair-wise facial classifier to identify the person; and further to identify changes facial appearance attributes present in the one or more facial images;

calculating a subject recognition confidence value for the person responsive to the facial recognition model and the identified changes in the facial appearance attributes of the person in the one or more facial images;

comparing the calculated subject recognition confidence value for the person to prior subject recognition confidence values calculated using prior images of the person to identify changes in the subject recognition confidence values associated with either individual;

analyzing the identified changes in the subject recognition confidence values to determine whether a new facial recognition model for the person should be generated based on the identified changes in the facial appearance attributes of the person;

generating the new facial recognition model from current or subsequent images of the person if it is so determined by the step of analyzing the identified changes; and using the new facial recognition model for subsequent person recognition tasks.

26. The method of claim 25 wherein pair-wise facial classifiers for different pairs of individuals in the household are based on different facial features.

27. The method according to claim 1 wherein the changes in the appearance of the person include facial texture changes, facial geometry changes, facial coloring changes, changes due to the use of cosmetics, changes resulting from the presence, absence or styling of hair, or combinations thereof.

28. The method according to claim 1 wherein the new facial recognition models are used in person recognition tasks that include providing identification of the person in new images or in images that are present within or being added to an image collection.

29. The method according to claim 12 wherein at least two different facial recognition models are concurrently provided for the person, each facial recognition model corresponding to a different appearance condition of the person.

30. The method according to claim 13 wherein the identification of significant changes in the subject recognition confidence values is responsive to one or more change detection criteria including a total change criterion, a percent change criterion, a threshold change criterion, a rate of change criterion, or a duration of change criterion.

31. The method according to claim 14 wherein the similarity score distributions are determined for a plurality of persons that are members of a household.

32. The method according to claim 31 wherein the step of calculating similarity score distributions includes pair-wise facial classifiers for at least one pair of persons in the household.

* * * * *

UNITED STATES PATENT AND TRADEMARK OFFICE
CERTIFICATE OF CORRECTION

Page 1 of 1

PATENT NO. : 8,180,112 B2
APPLICATION NO. : 12/017131
DATED : May 15, 2012
INVENTOR(S) : Andrew F. Kurtz et al.

It is certified that error appears in the above-identified patent and that said Letters Patent is hereby corrected as shown below:

| Issued Patent | | Description of Error |
|---|---|---|
| Column | Line | |
| 32 | 21 | "of" should be --to-- |
| 32 | 26 | "of subsequent" should be --or subsequent-- and "is" should be --if-- |
| 33 | 20 | "on" should be --one-- |
| 34 | 48 | "of" should be --or-- |

Signed and Sealed this
Thirty-first Day of July, 2012

David J. Kappos
*Director of the United States Patent and Trademark Office*